July 17, 1962 H. M. PAYNTER 3,044,703

LUMPED STRUCTURES METHOD AND APPARATUS AND APPROXIMATION OF UNIFORM MEDIA BY LUMPED STRUCTURES

Filed June 24, 1954 7 Sheets-Sheet 1

INVENTOR
Henry M. Paynter
BY
Curtis, Morris & Safford
ATTORNEYS

INVENTOR
Henry M. Paynter
BY
Curtis, Morris & Safford
ATTORNEYS

TABLE 1

| n→ | 0 | 1 | 2 | 3 | 4 | 5 | 6 | 7 | 8 | 9 | 10 |
|---|---|---|---|---|---|---|---|---|---|---|---|
| $\phi_0$ | 1.000 | .250 | .142 | .099 | .075 | .061 | .051 | .044 | .039 | .034 | .031 |
| $\psi_1$ | | .541 | .289 | .199 | .152 | .122 | .103 | .088 | .078 | .069 | .062 |
| $\phi_1$ | | .750 | .311 | .205 | .154 | .124 | .104 | .089 | .078 | .070 | .063 |
| $\psi_2$ | | | .367 | .218 | .159 | .127 | .105 | .090 | .079 | .070 | .063 |
| $\phi_2$ | | | .547 | .244 | .168 | .131 | .108 | .092 | .080 | .071 | .064 |
| $\psi_3$ | | | | .295 | .182 | .137 | .111 | .094 | .081 | .072 | .064 |
| $\phi_3$ | | | | .452 | .209 | .146 | .116 | .096 | .083 | .073 | .065 |
| $\psi_4$ | | | | | .257 | .160 | .122 | .100 | .085 | .075 | .066 |
| $\phi_4$ | | | | | .394 | .185 | .131 | .105 | .088 | .077 | .068 |
| $\psi_5$ | | | | | | .229 | .145 | .111 | .092 | .079 | .070 |
| $\phi_5$ | | | | | | .353 | .168 | .120 | .097 | .082 | .072 |
| $\psi_6$ | | | | | | | .210 | .133 | .103 | .086 | .074 |
| $\phi_6$ | | | | | | | .322 | .155 | .112 | .090 | .077 |
| $\psi_7$ | | | | | | | | .193 | .124 | .097 | .081 |
| $\phi_7$ | | | | | | | | .299 | .143 | .105 | .085 |
| $\psi_8$ | | | | | | | | | .180 | .117 | .091 |
| $\phi_8$ | | | | | | | | | .280 | .134 | .099 |
| $\psi_9$ | | | | | | | | | | .168 | .111 |
| $\phi_9$ | | | | | | | | | | .264 | .126 |
| $\psi_{10}$ | | | | | | | | | | | .160 |
| $\phi_{10}$ | | | | | | | | | | | .250 |

INVENTOR
Henry M. Paynter
BY
Curtis, Morris & Safford
ATTORNEYS

INVENTOR
Henry M. Paynter
BY
Curtis, Morris + Safford
ATTORNEYS

INVENTOR
Henry M. Paynter
BY
Curtis, Morris & Safford
ATTORNEYS

INVENTOR
Henry M. Paynter
BY
Curtis, Morris & Safford
ATTORNEYS

INVENTOR
Henry M. Paynter
BY
Curtis, Morris & Safford
ATTORNEYS

United States Patent Office 3,044,703

Patented July 17, 1962

3,044,703

LUMPED STRUCTURES METHOD AND APPARATUS AND APPROXIMATION OF UNIFORM MEDIA BY LUMPED STRUCTURES

Henry M. Paynter, 132 West St., Reading, Mass.

Filed June 24, 1954, Ser. No. 439,170

24 Claims. (Cl. 235—184)

This invention relates to method and apparatus for the representation of "uniform" continuous media by "lumped" constant procedures and for the exploitation of the beneficial characteristics of "uniform" continuous media by "lumped" structures, and relates to the accurate approximation of the input and output characteristics of such "uniform" continuous media by "lumped" structures. This invention also relates to improved "lumped" structures for various operational uses such as in calculating, computing, control, and measuring devices and to improved "lumped" constant impedance representations, time-delay structures, and filters.

The method and apparatus of the present invention provide many advantages in the representation of "uniform" continuous media. With the present invention existing "continuous" media are represented to a better approximation by a "lumped" structure having any given number of "lumped" elements than has been done heretofore with the same number of "lumped" elements.

The method and apparatus of the present invention provide many advantages in enabling the exploitation of the desirable characteristics of all kinds of "uniform" continuous media while actually allowing the exploiter to use all kinds of "lumped" media as the means for the exploitation. Thus, the advantageous characteristics of "uniform" continuous media are obtained, and yet any of their undesirable characteristics may be conveniently avoided.

The broad definition of "uniform" continuous media will be given hereinafter, but an example of such a medium is a mile of elastic pipeline two feet in diameter and full of water. Lengths of pipeline of this nature are often used in water supply and hydro-electric power generation systems, and, for example, it may be assumed to be a pipeline 20 such as is shown in FIGURE 1, extending from a large reservoir 22 down to a turbine 24. Another example of such a "uniform" continuous medium is an electric power transmission line 28 as shown in FIGURE 2, such as is commonly seen stretching across the countryside between an electrical generating station 29 and a distribution substation 30. Another example is a straight shaft 32 of constant diameter, as shown in FIGURE 3, such as the propeller shaft on an ocean liner extending from the drive unit 34 to the screw 36.

As will become more apparent later on, there are a great fundamental variety of such "uniform" continuous media, electrical and mechanical, including hydraulic, pneumatic, thermal, chemical and acoustic systems. These "uniform" continuous media have many desirable characteristics making them well suited for use in engineering applications, scientific equipment and testing operations, in fact, in a great many applications or operations where a tool or mechanism or equipment of any sort is used. But "uniform" continuous media are not so widely used because of certain undesirable characteristics. These "uniform" continuous media in general may be characterized as relatively bulky and expensive to build, with the result that often some less desirable arrangement must be used in order to economize. The method and apparatus of the present invention make it economical to exploit the desirable features of "uniform" continuous media.

Another important advantage of the present invention arises from the fact that it enables economical representations of "uniform" continuous media to be built for testing or measurement. For example, during the design of a new hydro-electric system or any other new "uniform" continuous media, and in the investigation of the characteristics and behavior of existing ones under varying assumed service conditions, i.e., under transient conditions, it is often impracticable to experiment upon the media themselves. Thus, for example, it is difficult and expensive to carry out measurements on the pipeline of FIGURE 1 in order to determine the way in which abrupt changes in turbine load affect the flow of water from the reservoir into the mouth of the pipeline. Likewise, it is difficult to determine the effect at the electrical generating station 29 of a short-circuit of the transmission line of FIGURE 2, for instance, occurring at a substation 30.

In order to investigate these and many other widely different phenomena and characteristics relating to such "uniform" continuous media and to aid in the design of such media, it is very helpful to build models which are much less expensive and bulky than the prototypes which they represent and better adapted for experimental purposes. The present invention provides method and apparatus for the economical approximation of the input and output characteristics of "uniform" continuous media by "lumped" constant structures.

According to aspects of my invention, improved "lumped" constant structures are provided for operational uses in measurement, computational, and various other applications wherein it is desired or necessary to obtain the characteristics of "uniform" continuous media, for instance, as wave filters, impedances, or time-delay structures, but wherein the employment of the continuous media themselves is impracticable. Moreover, as will be apparent from the description and as emphasized by the various embodiments of my invention described hereinafter, any of the "lumped" structures according to my invention, for any of the various operational uses as mentioned above, may take any suitable form, such as electrical, mechanical, thermal, or even other types of dynamical systems, including combinations of these various types of systems. Examples of some of the many possible applications for the invention are in video filter and pulse forming amplifiers, feedback amplifiers, analog computers and synthesizers, impedance matching transducers at the end of "uniform" continuous media, and for filtering and transient pressure control of hydraulic pipelines. These and many other applications of my invention will be understood from the description hereinafter.

Among the advantages of the method and apparatus of my invention are those arising from the fact that they may be used in directly modelling "uniform" continuous media for purposes of analogue computation. Moreover, with my invention new "lumped" systems having novel characteristics may be designed by modelling various hypothetical "uniform" media on an analog computer, using the computer to test the characteristics of the hypothetical "uniform" media and then building a "lumped" structure having the novel characteristics worked out in this way.

In describing the full scope of this invention as is apparent from the foregoing, it is necessary to include all kinds of "uniform" continuous media, and all kinds of "lumped" constant structures, including electrical, mechanical, thermal, chemical, acoustical, hydraulic, and other systems; however, there is not at hand in the other fields such a well-developed terminology as is available in the electrical field, and hence in many places throughout the specification it will be necessary to use terminology which is predominantly electrical, but such terminology is intended to be interpreted in its broadest sense so as to include mechanical and these other dynamical systems too.

The distinctions between "uniform" continuous media and "lumped" constant structures are that a "uniform" continuous medium may be generally characterized as having a smooth or uniform appearance in which the factors or constants bearing upon the behavior of the medium are distributed along its entire length, while in a "lumped" constant structure these factors or constants are located in distinct regions. From an abstract point of view, a "uniform" continuous medium can be considered as one in which no discrete points can be distinguished from any other corresponding points, for all corresponding points along the length of the medium are substantially alike at the frequencies under consideration. For example, the water and metal in the mile length of pipeline is exactly the same at all points, and every cross section contributes to the overall characteristics of the pipeline. Likewise, along the length of an electrical power transmission line, the inductance, capacitance, resistance, radiation losses, and shunt conductance are distributed substantially uniformly along the whole length of the line, so that all corresponding points along the line are alike.

In considering further the distinctions between "uniform" continuous media and "lumped" structures, it should be noted that in any system or structure under so-called steady-state conditions, usually only a few or even no oscillation frequencies are present, but under transient conditions many such frequencies may be present. For example, when the turbine is running steadily under a constant load for long periods of time, the water flows at a constant speed from the reservoir into the mouth of the pipeline. But when sudden disturbances are applied, wide ranges of frequencies often are set up for brief periods of time, called transient disturbances. Thus, an erratic change in loading on the turbine causes a disturbance including different frequencies which move along the pipeline to the reservoir. Another type of disturbance in a different medium is the voltage surge sent along the transmission line to the generating station caused by a short-circuit or by a bolt of lightning striking the line. Likewise, in the case of a propeller shaft on an ocean liner such a sudden disturbance can occur when a large wave lifts the stern of the liner so that the screw rises into the air. This sudden decrease in load sends a torsional shock wave along the propeller shaft to the driving unit.

Each of these various types of disturbances appears as a wave phenomenon and includes a certain range of frequencies. For example, the voltage surge on the transmission line may include frequencies up into the millions of cycles per second, whereas a pressure surge in the pipeline caused by sudden changes in loads on the turbine may include frequencies up to only a few c.p.s.

As used herein, a "lumped" constant system or structure is one in which the largest dimension of any of the various components in the system or structure is very much smaller than the wave length of the shortest waves therein. A similar type of distinction applies to mechanical and other systems.

As used herein, a "uniform" continuous medium is one in which the operational series impedance per unit length and shunt admittance per unit length are each substantially constant from point to point along the length of the medium. Hence, such media all exhibit a constant surge impedance (also known as characteristic impedance) and a constant propagation function at all points along their length.

In the construction of models to represent such "uniform" continuous prototype media, it has been customary to replace the continuously distributed constants in the prototype medium by a greater or lesser number of individual elementary components, often called "lumped"

components or "lumped" elements, which are interconnected so as to simulate the prototype as closely as possible. These models may be called "lumped" or "lumped" constant structures, networks, or representations. And it is known that in order to produce a better representation of the "uniform" prototype it is necessary to use a model having a greater number of "lumped" components. When progressively fewer and fewer "lumped" components are used in a model, it becomes a progressively poorer representation of the prototype.

In accordance with aspects of my invention the input and output characteristics of any "uniform" continuous medium can be represented by a plurality of lumped components of any kind and to any degree of exactitude, depending upon the number of "lumped" components used in the model. For example, a pipeline such as the one described above can be represented by an electrical model or by an hydraulic model or by a model built up from a plurality of solid bodies such as torsional rods with appropriately arranged weights, and the same applies to electrical, mechanical, or other systems. Thus, the input and output characteristics of any "uniform" continuous media whether it be electrical or mechanical, including all various types of mechanical systems, such as hydraulic, pneumatic, acoustic, solid-bodies, etc., and thermal systems can be represented by a model composed of "lumped" components of any kind, whether they be electrical or any form of mechanical components, and this representation is more like its prototype than any model in use today having an equal number of identical elementary component elements. Furthermore, with fewer "lumped" components this representation is as exact as any model in use today having a considerably greater number of identical elementary "lumped" components.

In many "lumped" constant systems or structures as they are used today and in models of "uniform" media, it is customary to employ a plurality of lumped elements of equal size and to connect them together in an iterative structure, that is, one in which the structure contains identical substructures which repeat themselves a number of times. These iterative structures tend to represent the characteristics at all points along the length of the "uniform" continuous medium, so that by taking measurements at various places in the model, one can approximately determine the behavior of the prototype at corresponding points along its length. However, iterative structures have certain undesirable characteristics as indicated hereinafter, and in order partially to compensate for them it is customary in the electrical field to use one or more specially designed circuit sections at one or both ends of the iterative structure, often called terminating or matching sections. A model embodying my invention does not require terminating sections; however, an advantage of the method of my invention is that it may be used to provide "lumped" constant matched terminations for uniform" continuous media.

In "lumped" constant representations embodying the present invention, it is the input and output characteristics of the "uniform" continuous media which are represented. That is, the model represents the effects of a disturbance at its point of origin in the "uniform" medium, herein called the input point, and the effects at the far end of the medium, herein called the output point. Thus, for example, a model embodying the invention may represent the effects at the turbine or input end of the pipeline and at the reservoir or output end of the line caused by disturbances set up in the line as a result of the changes in the operation of the turbine.

According to an aspect of my invention, models embodying the invention which represent the input and output characteristics of "uniform" continuous media are more nearly representative of these characteristics of the media than any models in use today having the same numbers of identical elementary "lumped" components. Thus they enable better, more economical exploitation of the desired characteristics of the "uniform" media they represent.

According to another aspect of my invention, models embodying the invention are as representative of the input and output characteristics of the prototype media as many models in use today having considerably greater numbers of "lumped" components.

In accordance with aspects of the method and apparatus of the present invention "lumped" constant structures are provided for use in communication, measurement control, and calculation and in which the magnitudes of their various components are different from one another and bear predetermined relationships to one another. The values of successive components follow graduated curves whose shapes are predetermined in a way depending upon the order of approximation.

The method of the present invention furnishes an equivalent synthesis wherein the $n$th order representation exactly duplicates the first $n$ zeros and first $n$ poles of the prototype (e.g. its natural frequencies or resonances and anti-resonances). The method of the invention provides a systematic representation of the prototype from a pole-zero standpoint which may be made as nearly like the prototype as desired merely by increasing the order of approximation.

One advantage of apparatus embodying the present invention is that its behavior is entirely predetermined so that its zeros and poles exactly coincide with those of the prototype. Thus, the behavior of the model is entirely predictable before the model is built.

The purely iterative structures in use today without terminating sections have the disadvantage that they "ring," i.e., resonate at spurious frequencies not present in the prototype. Models embodying my invention do not ring in this sense.

Another advantage of my invention is the provision of "lumped" constant representations of uniform media having the desirable time-delay properties of "uniform" continuous media.

A further advantage of the method of my invention is that it provides wave filters which have substantially no phase distortion within the pass band. This is not true of any other lumped constant iterative wave filters in use today. Moreover, the cut-off frequency of a "lumped" constant wave filter structure embodying my invention is relatively much higher than that of an iterative structure having the same number of elementary "lumped" elements, thereby providing an output signal which is much more nearly like the portion of the input signal lying within the pass band of the filter than is obtained from conventional "lumped" constant filter systems having the same number of elementary "lumped" elements.

A further advantage of my invention is the provision of method and apparatus whereby the input-output characteristics of "uniform" continuous media are relatively closely represented by "lumped" constant structures having relatively few elementary "lumped" components and whereby these "lumped" constant structures have many of the highly desirable properties of "uniform" continuous media for use as time-delay structures, impedance transformers and the like.

A still further advantage of my invention is the provision of method and apparatus whereby the characteristics of "uniform" continuous media are readily and systematically represented by "lumped" constant structures whose behavior is predictable before the "lumped" constant structure is built.

These and other objects, aspects, and advantages of my invention will be in part pointed out and in part apparent from the following description taken in conjunction with the accompanying drawings, in which:

FIGURE 1 diagrammatically shows a hydro-electric pipeline system;

Figures 1, 2:
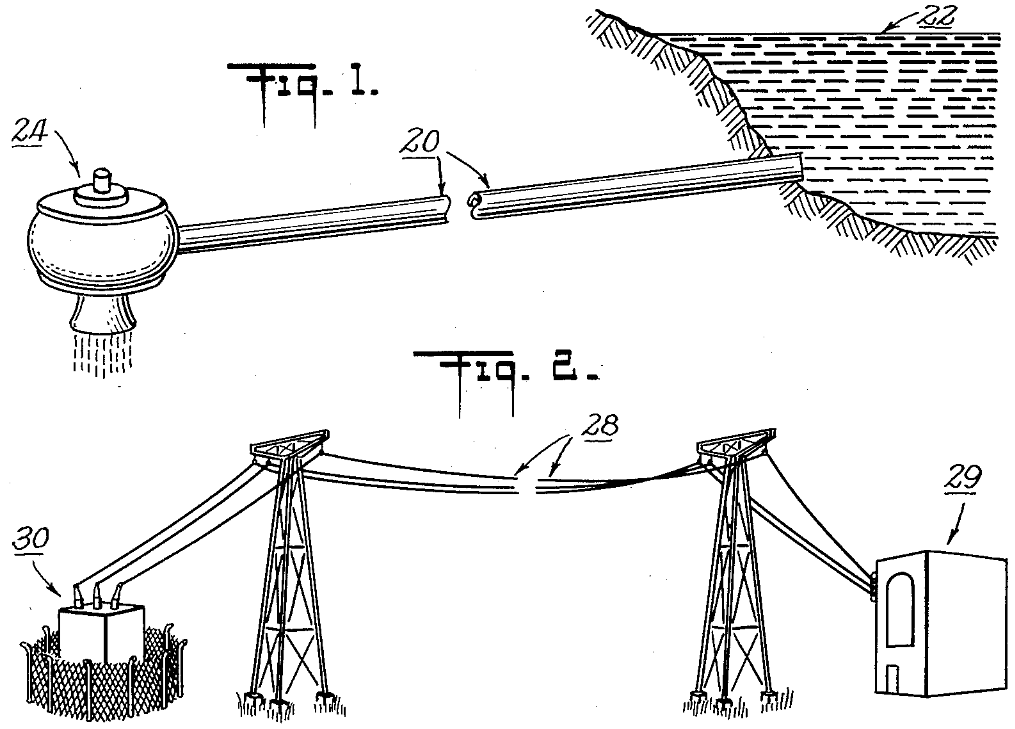
FIGURE 2 shows an electrical transmission line extending from a substation to an electrical power generating plant.
Figures 3, 4A:
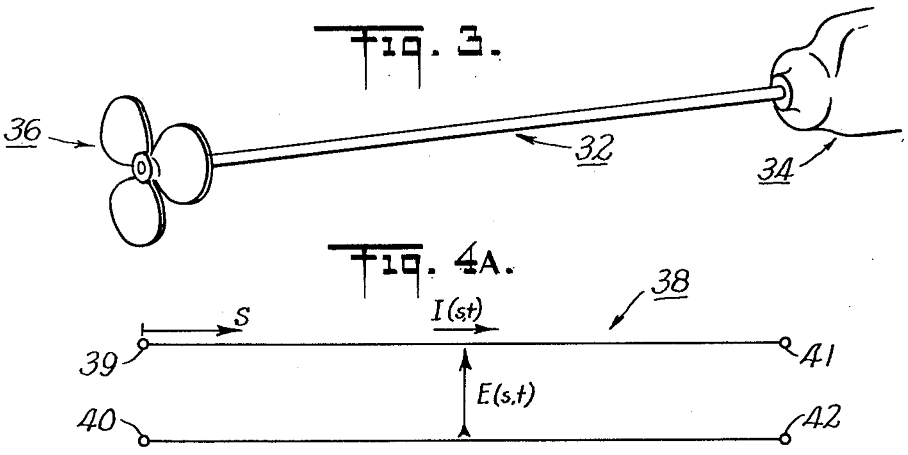
FIGURE 3 shows the propeller shaft system of an ocean liner.
Figure 4B:
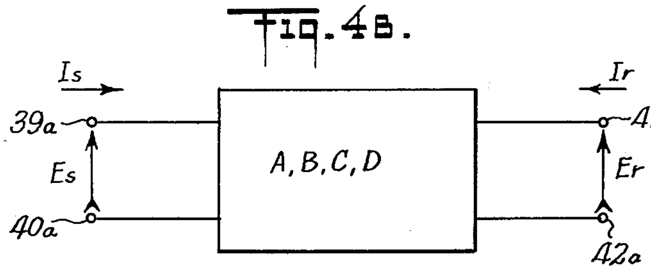
Figure 5A:
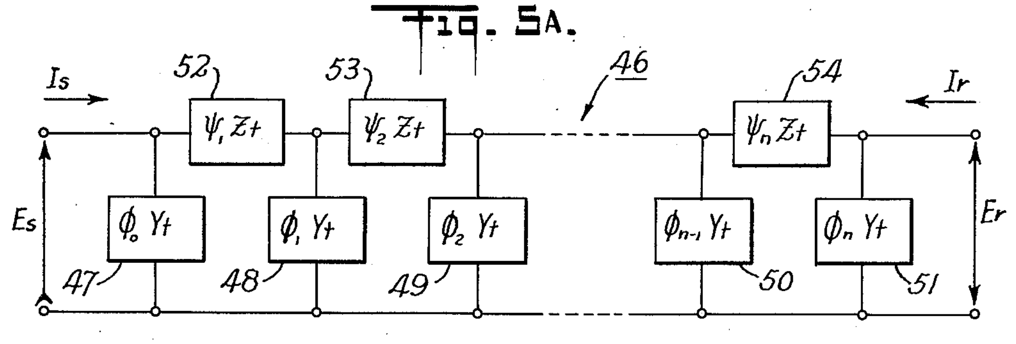
Figure 5B:
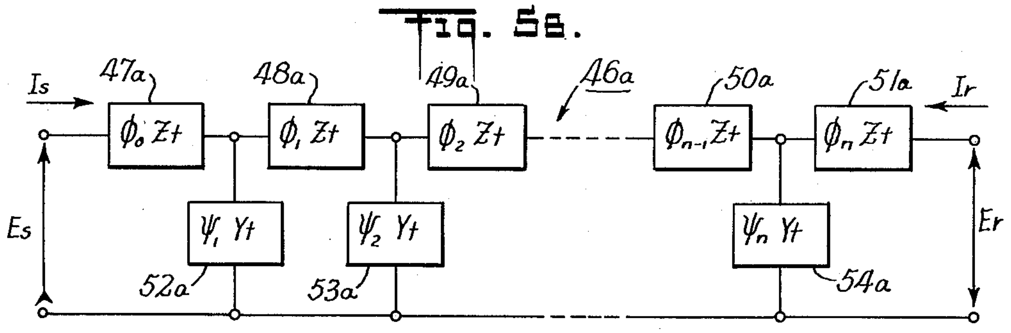
Figure 8A:
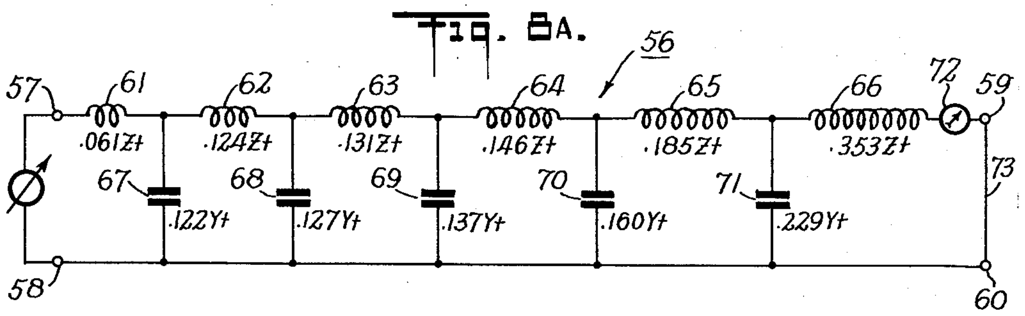
Figure 8B:
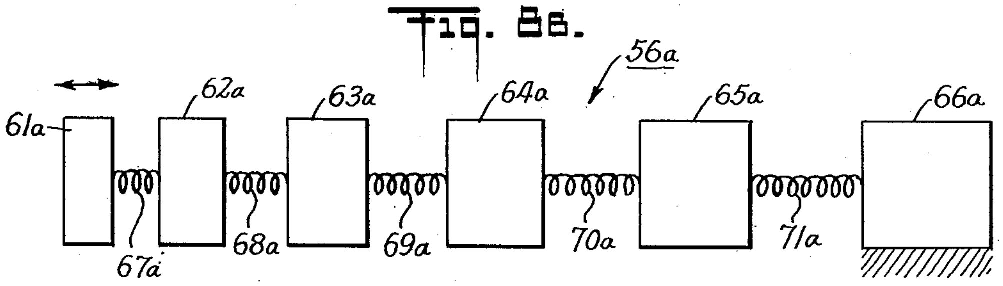
Figures 6, 7:
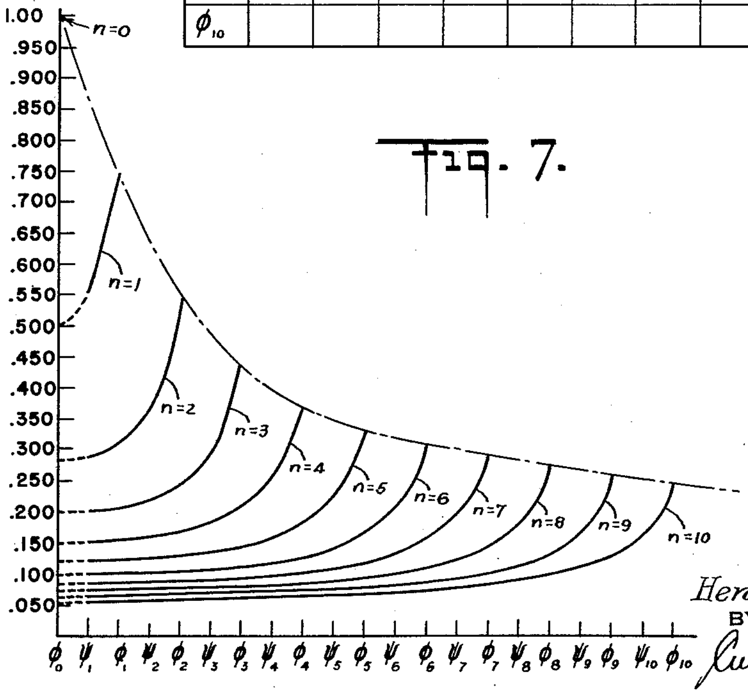
Figures 9, 10, 11, 12, 13:
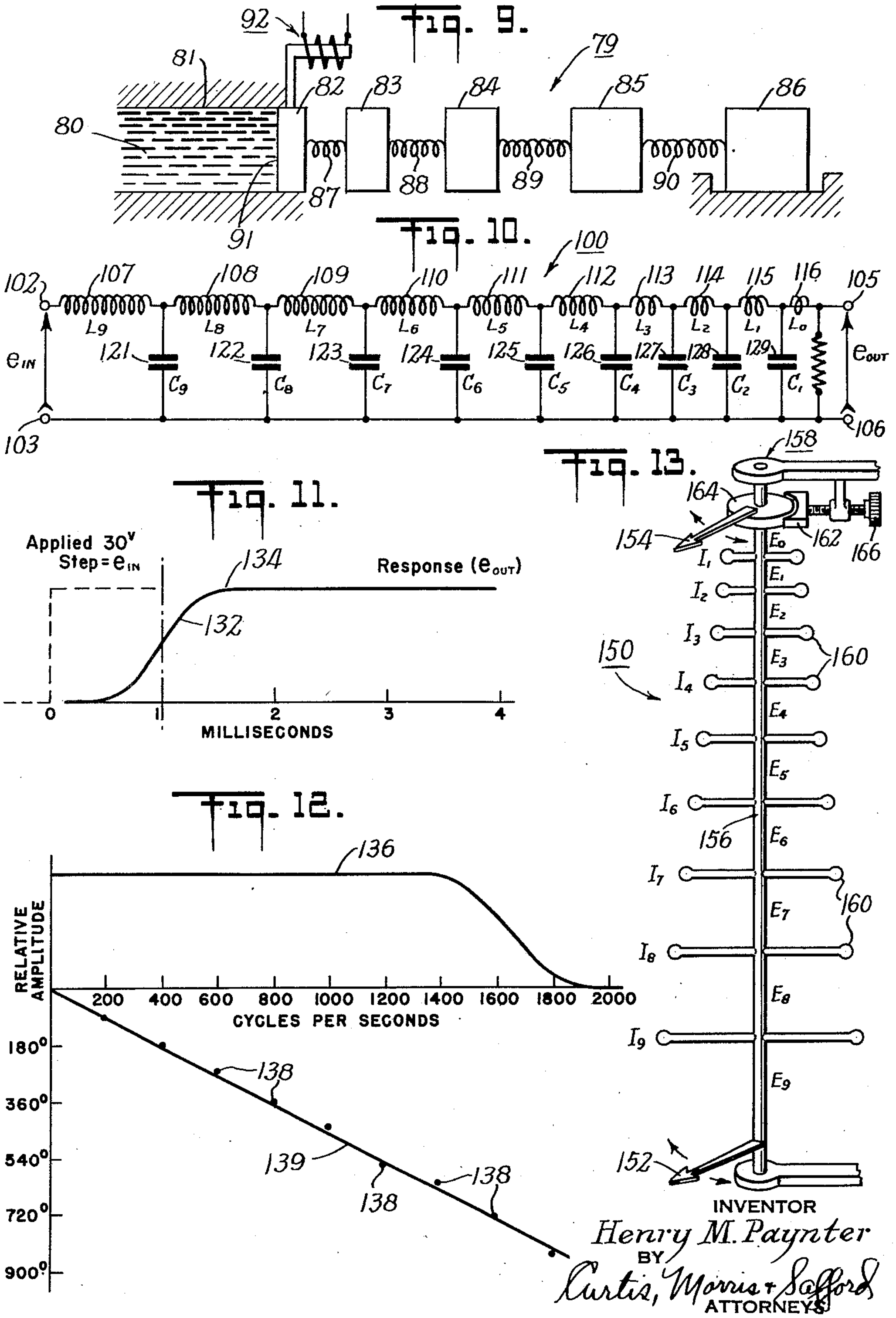
Figure 14A:
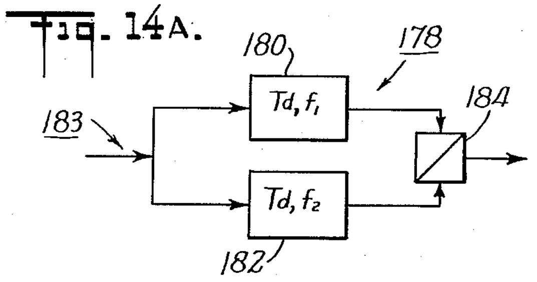
Figure 17A:
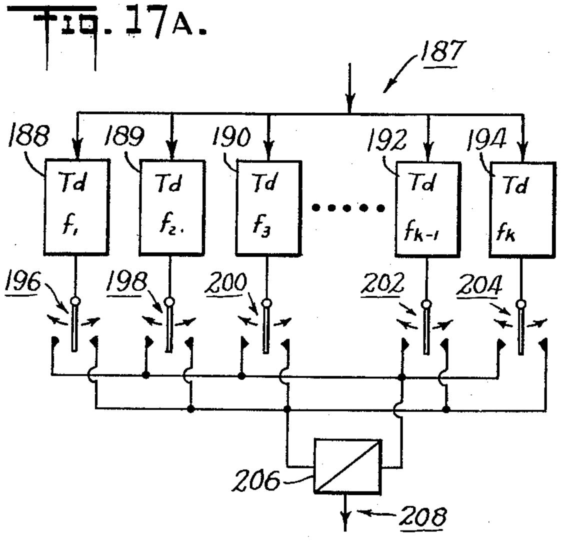
Figure 18A:
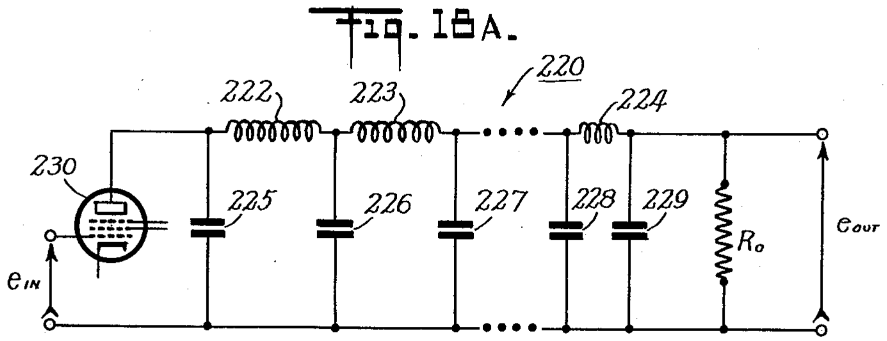
Figure 18B:
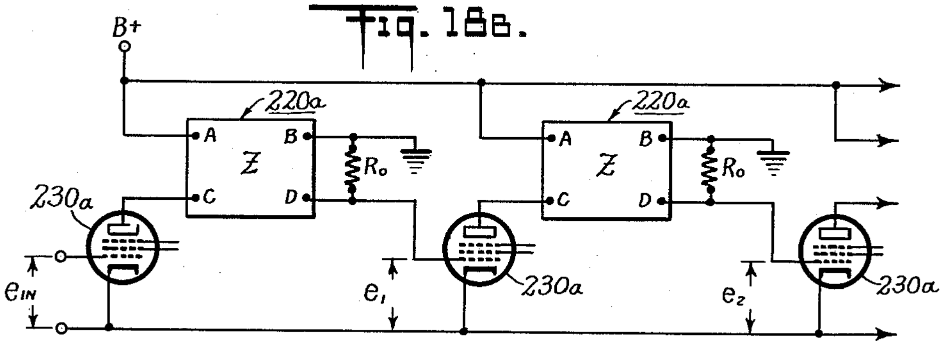
Figure 19:
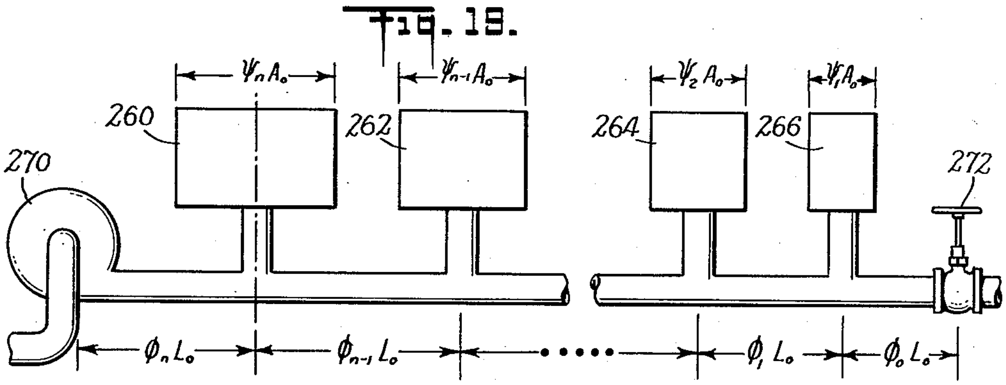
Figure 20:
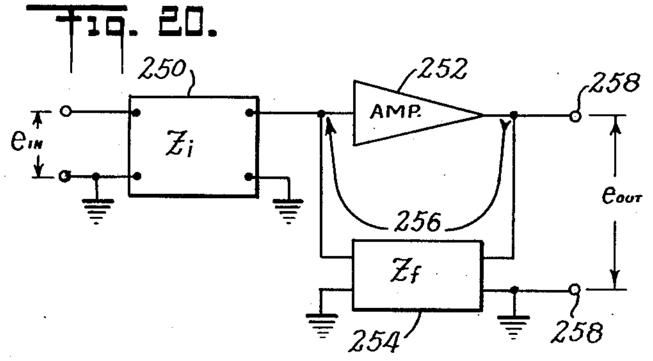

FIGURE 4A schematically shows a transmission line and represents certain relationships therealong for purposes of explanation;

FIGURE 4B is a diagrammatic operational representation of the line of FIGURE 4A;

FIGURES 5A and 5B are diagrammatic representations of circuit networks for purposes of explanation;

FIGURE 6 is Table I giving the values of the distribution coefficients for "lumped" constant systems or structures embodying my invention;

FIGURE 7 is a plot of the distribution coefficients of Table I;

FIGURE 8A shows a "lumped" constant electrical circuit representation of the "uniform" continuous media shown in FIGURES 1, 2, and 3;

FIGURE 8B shows a "lumped" constant mechanical representation of these media;

FIGURE 9 diagrammatically illustrates a "lumped" constant mechanical system with relative values in accord with Table I and used to provide an impedance termination matched to the surge impedance of a fluid in a pipeline;

FIGURE 10 shows a "lumped" constant electrical time-delay network with relative values in accord with Table I;

FIGURES 11 and 12 show the delay characteristic and amplitude-phase response, respectively, of the delay line of FIGURE 10;

FIGURE 13 is a schematic diagram of a "lumped" constant torsional delay line with values from Table I;

FIGURES 14A and B, 15A and B, and 16A and B illustrate and show the characteristics of various filters incorporating "lumped" delay lines with values in accordance with Table I;

FIGURES 17A and B diagrammatically illustrate a selective multi-channel filter utilizing "lumped" delay lines with values from Table I;

FIGURE 18A schematically shows a single stage amplifier incorporating a "lumped" element network with values from Table I;

FIGURE 18B schematically shows a multi-stage amplifier incorporating "lumped" element networks with values from Table I;

FIGURE 19 diagrammatically represents a pipeline pumping system with vibration and surge absorbing chambers of various sizes according to my invention arranged at intervals along the line;

FIGURE 20 schematically illustrates a feedback amplifier with "lumped" constant circuits in the input and feedback path; and FIGURES 21, 22, 23, and 24 are diagrammatic illustrations for purposes of explaining the application of aspects of the present invention to analogue computational work.

As mentioned above, FIGURES 1, 2, and 3 are specific examples of systems involving "uniform" continuous media, and in order to explain fully my invention, it is necessary to develop certain mathematical concepts and procedures applying to "uniform" continuous media. For convenience of explanation, the following description is in part developed from the electrical relationships present along a two-wire transmission line. Electrical symbols and terminology such as "current" and "voltage" are used, but it should be borne in mind that this description is intended by analogous reasoning to apply to mechanical, thermal, and all other systems too.

A "uniform" continuous two-wire transmission line 38 is schematically shown in FIGURE 4A stretching between a pair of input terminals 39 and 40 and a pair of output terminals 41 and 42. The distance $s$ along the line is measured from the input terminals, and the current I and the voltage E at any point along the line are, in general, functions of the distance $s$ and the time $t$, as indicated in FIGURE 4A, and are governed by the following equations, where $$p=\frac{d}{dt}$$

$$(1)\qquad \frac{\partial E}{\partial S}+Z_{(p)}\cdot I=0$$

$$(2)\qquad \frac{\partial I}{\partial S}+Y_{(p)}\cdot E=0$$

In these equations $Z_{(p)}$ and $Y_{(p)}$ are the operational series impedance and shunt admittance, respectively, per unit length of line. These are hereafter assumed to be constant, i.e., uniform from point to point along the line, in accord with the definition of a "uniform" continuous medium given above. It should be emphasized that in the overall scope of my invention $Z_{(p)}$ and $Y_{(p)}$ should be considered broadly as any operational impedance and admittance for any structure, system or circuit which is capable of being realized exactly or by approximation in the prototype "uniform" continuous case, even including arrangements involving mutual coupling effects.

"Lumped" constant structures embodying my invention are capable of approximate representation of any media with any such $Z_{(p)}$ and $Y_{(p)}$. Conversely, to every lumped structure, system or circuit designed and constructed after the method of my invention, there corresponds an equivalent, even if fictitious, i.e. unrealizable, continuous system.

Again, it is emphasized that the electrical terminology used hereinafter is intended to apply analogously to all other systems. Thus, the line 38 may be considered in terms of the generalized four terminal network representation 44 shown in FIGURE 4B and having input terminals 39*a* and 40*a* and output terminals 41*a* and 42*a*. The sending-end current $I_s$ and sending-end voltage $E_s$ are related to the receiving-end current $I_r$ and receiving-end voltage $E_r$ through the operational characteristics of the network, governed by the nature of the operational elements $A_{(p)}$, $B_{(p)}$, $C_{(p)}$, and $D_{(p)}$, which constitute the generalized circuit operators. These relationships may be written as follows:

$$(3)\qquad \begin{cases} E_s=A_{(p)}\cdot E_r+B_{(p)}\cdot I_r \\ I_s=C_{(p)}\cdot E_r+D_{(p)}\cdot I_r \end{cases}$$

$$(4)\qquad \begin{cases} E_r=D_{(p)}\cdot E_s-B_{(p)}\cdot I_s \\ I_r=-C_{(p)}\cdot E_s+A_{(p)}\cdot I_s \end{cases}$$

Assuming that the line 38 has a length $l$, then these four operational elements may be defined as follows:

$$(5)\qquad \begin{cases} A_{(p)}=\cosh\gamma \qquad B_{(p)}=Z_0\sinh\gamma \\ C_{(p)}=Y_0\sinh\gamma \qquad D_{(p)}=\cosh\gamma \end{cases}$$

where:

$$Z_0=\frac{1}{Y_0}=\sqrt{Z_t/Y_t}$$

$$\gamma=\sqrt{Z_tY_t},\ Z_t=l\cdot Z_{(p)},\ Y_t=l\cdot Y_{(p)}$$

The open-circuit impedance of the line ($I_r=0$) is given by:

$$(6)\qquad Z_y=A/C=Z_0\frac{\cosh\gamma}{\sinh\gamma}=Z_0\coth\gamma$$

and the corresponding open-circuit admittance is:

$$(7)\qquad Y_y=\frac{1}{Z_y}=Y_0\tanh\gamma$$

The short-circuit impedance of this same line (i.e. with $E_r=0$) is:

$$Z_z=B/D=Z_0\frac{\sinh\gamma}{\cosh\gamma}=Z_0\tanh\gamma$$

Sinh $\gamma$ and cosh $\gamma$ can be expressed as infinite product expansions as follows:

$$(8)\qquad \sinh\gamma\equiv\gamma\prod_{k=1}^{\infty}[1+A_k\gamma^2];\ \cosh\gamma\equiv\prod_{k=1}^{\infty}[1+B_k\gamma^2]$$

where:

$$A_k=\left[\frac{1}{k\pi}\right];\ B_k=[2/(2k-1)\pi]^2$$

Hence, the impedance and admittance operators can be written:

$$(9)\qquad \frac{Y_y}{Y_t}\equiv\frac{Z_z}{Z_t}\equiv\prod_{k=1}^{\infty}\left[\frac{1+A_kZ_tY_t}{1+B_kZ_tY_t}\right]$$

It should be noted that duality principles are implicit in this formulation, that is, the open-circuit admittance when the line is considered as current driven is the dual of the short-circuit impedance when it is considered as voltage driven.

The impedance and admittance operators expressed in Equation 9 apply to "uniform" continuous media. In order to develop the method of the representation of the operational characteristics of these media in a "lumped" constant structure, these operators are associated with a finite $n$-fold product, as follows:

$$(10)\qquad \frac{Y_{yn}}{Y_t}\equiv\frac{Z_{zn}}{Z_t}\equiv\prod_{k=1}^{n}\left[\frac{1+A_kZ_tY_t}{1+B_kZ_tY_t}\right]=\frac{N_n}{D_n}$$

The numerator $N_n$ and the denominator $D_n$ of the finite $n$-fold product are seen to constitute the odd and even parts of a Hurwitz polynomial. These operators can therefore be expanded in a finite continued fraction form as:

$$(11)\qquad Y_{yn}=\phi_0Y_t+\cfrac{1}{\psi_1Z_t+\cfrac{1}{\phi_1Y_t+\cfrac{1}{\psi_2Z_t+\cdots\cfrac{1}{\phi_nY_t}}}}$$

$$(12)\qquad Z_{zn}=\phi_0Z_t+\cfrac{1}{\psi_1Y_t+\cfrac{1}{\phi_1Z_t+\cfrac{1}{\psi_2Y_t\cdots\cfrac{1}{\phi_nZ_t}}}}$$

These finite continued fractions are realizable in finite ladder networks 46 and 46*a* as shown in FIGURES 5A and 5B, respectively. In each of the networks there are $2n+1$ operational elements, which include, as the case may be, $n+1$ admittances 47, 48, 49, 50, and 51 (or impedances 47*a*, 48*a*, 49*a*, 50*a*, and 51*a*) in shunt (or series) and $n$ impedances 52, 53, and 54 (or admittances 52*a*, 53*a*, and 54*a*) in series (or shunt).

As will be seen from FIGURES 5A and 5B, each of the operational elements results from the multiplication of some coefficient times the total series impedance $Z_t$ or times the total shunt admittance $Y_t$ of the prototype "uniform" continuous medium as defined above. For example, the first shunt admittance 47 in the line 46 is obtained by the product of $Y_t$ and the coefficient $\phi_0$. Likewise the series impedance 52 is obtained by the product of $Z_t$ and $\psi_1$.

In order to determine the total series impedance $Z_t$ or the total shunt admittance $Y_t$ of the prototype "uniform" continuous medium, the following relationships are noted: The series impedance per unit length of the medium $Z_{(p)}$ is equal to $R+j\omega L$, and the shunt admittance per unit length $Y_{(p)}$ is equal to $G+j\omega C$, where R, L, C, and G are per unit length. As stated in the definitional equations of (5) above, the total series impedance or total shunt admittance of a medium is the value per unit length times the actual length $l$. For example, in an electrical transmission line the resistance R per unit length and also the total resistance can be measured by an ohm-meter. The total inductance can be measured by measuring the rate of current change when the applied voltage is suddenly changed by a known amount. The shunt (leakage) resistance can be measured by a high impedance ohm-meter, and from this can be determined the shunt conductance G per unit length and the total shunt conductance. The total capacitance can be measured by applying a known charge and then measuring the resulting voltage across the line. Although this paragraph uses an electrical example, it will be appreciated that $Z_t$ and $Y_t$ for other types of systems, such as mechanical, thermal, chemical, acoustical, and hydraulic systems can be determined by analogous measurements.

The Radio Engineers' Handbook by Terman, first edition (1943) on pages 172 and 173 discusses the relationship between characteristic impedance, series impedance per unit length, shunt admittance per unit length and R, L, C, and G. High Frequency Measurements by August Hand, first edition (1933), on pages 383–387 discusses the measurement of characteristic (surge) impedance of a transmission line by measuring its open-circuit and short-circuit impedances.

Thus, the operational shunt admittance and series impedance of the prototype medium are distributed in the "lumped" representation or model in accordance with predetermined relationships as explained more in detail hereinafter. These various coefficients $\phi_k$ and $\psi_k$, i.e. ($\phi_0, \phi_1, \phi_2 \ldots \phi_{n-1}, \phi_n$) ($\psi_0, \psi_1, \psi_2 \ldots \psi_{n-1}, \psi_n$) may be called distribution coefficients for they set forth the way in which the relative values of the successive series and shunt elements are distributed. The values of these distribution coefficients $\phi_k$ and $\psi_k$ depend only upon the values of $A_k$ and $B_k$ which appear in the product expansion (1) above; and therefore, the relative values of $\phi_k$ and $\psi_k$ can be calculated as universal coefficients, for example, such as fractional values of unity or in percent.

I have calculated these relative values of the distribution coefficients, and they are plotted in Table I, shown in FIGURE 6, in universal form in terms of fractional values of unity, covering the first ten orders of approximation (i.e. up to $n=10$). The values in this table may be used to determine the values of the individual "lumped" elements in any particular application; all that is necessary is to multiply these universal distribution coefficients by the appropriate values of the total series impedance $Z_t$ and the total shunt admittance $Y_t$ for the particular prototype "uniform" continuous medium involved.

The values of $n$ are for various orders of approximation, and the particular order chosen in any case will depend upon the engineering requirements to be met by the model. As pointed out above, a representation according to my invention is more nearly like the prototype than a "lumped" constant model having the same number of identical elements, and has several advantages discussed in detail in the following paragraphs.

Models embodying this invention, within the range of frequencies for which the model is intended to be a representation, exactly represent the input-output characteristic values of the prototype at characteristic points occurring within a range of frequencies depending upon the order of approximation (e.g. its natural frequencies or resonances and anti-resonances are exactly represented). At other points within this range the amplitude and phase behavior of the model very closely corresponds to the behavior of the prototype, as may be determined mathematically by the least square error criterion. Because the behavior of the prototype at its characteristic value points is very often the most significant part of its over-all behavior, it is seen that a model according to my invention is, relatively speaking, a very good representation of the prototype.

According to aspects of the method of the present invention the operational series impedance and the operational shunt admittance of the "uniform" continuous prototype medium are distributed in the "lumped" representation or model so that the sum of the discrete series impedances in the model, in the case of a short-circuited output, or of the shunt admittance, in the case of an open-circuited output always equals the series impedance or shunt admittance, respectively, of the prototype, while the sum of the shunt admittances or series impedances respectively, in the model is less than overall admittance or series impedance of the prototype as the case may be. These latter factors will only approach the shunt admittance or series impedance of the prototype as the number of discrete admittances or impedances becomes infinite.

Table I should be sufficient for the great bulk of engineering work in this field; however, in order to aid anyone desiring to go beyond the tenth order of approximation, there are given hereinafter formulae for obtaining the values for the various distribution coefficients based upon extrapolation from those values given in this table and based upon certain theoretical studies which I have made.

Thus, if it is desired to represent the input and output characteristics of a prototype "uniform" continuous medium (such as the pipeline 20) to a 5th order of approximation, then a model with $n=5$ is chosen. This model will closely represent the behavior of the prototype over a range of frequencies up to and including its first five resonant frequencies and will exactly reproduce these resonant frequencies.

For example, shown in FIGURE 8A is a "lumped" constant electrical ladder network or model 56 for an $n=5$ representation of the pipeline 20 of FIGURE 1. This network model 56 has $2n+1=11$ elements and input terminals 57 and 58 and output terminals 59 and 60, respectively. The impedance elements 61, 62, 63, 64, 65, and 66 are connected in series between these pairs of terminals and the admittance elements 67, 68, 69, 70, and 71 are connected to successive impedance elements and are shunted across the network. It is seen that the model 56 has a configuration corresponding to the generalized network 46a shown in FIGURE 5B, and the output is short-circuited to represent the conditions at the reservoir end of the pipeline 20.

The pipeline 20 is open at the reservoir end and closed at the turbine end, and so it resonates with a velocity loop at the reservoir end and a velocity node at the turbine end; that is, it will resonate at frequencies whose wavelengths are 4L, 4/3L, 4/5L, 4/7L, 4/9L, etc., where L is the pipe length. Thus, with a pipe one mile long and assuming that disturbances travel at a rate of 3,100 feet per second through the water in the pipe, its first five resonant frequencies are 0.15, 0.44, 0.74, 1.03, and 1.33 cycles per second. The model 56 will closely represent the input and output characteristics of the pipeline 20 over a range of frequencies from zero to 1.33 cycles per second. Moreover, this network representation 56 will exactly reproduce these first five resonances, and at all other frequencies in this range the representation will be markedly close to the actual input-output characteristics of the pipeline. Moreover, the model 56 will not exhibit spurious resonances; it is completely predictable, as indicated further above.

The input terminals 57 and 58 correspond to the turbine end of the line 20, and the short-circuited output terminals 59 and 60 correspond to the reservoir end of the line 20. These output terminals are short-circuited to prevent any voltage changes from appearing thereacross, which is analogous to the reservoir end of the pipeline where no pressure changes appear, for the pressure there is constant, depending only on the depth of the water in the reservoir.

The values of the distribution coefficients for this 5th order of approximation are indicated in FIGURE 8A. Thus, the first series inductance element 61 has a value of .061 times the total series impedance $Z_t$ of the pipeline, which consists mainly of the inertance of the mass of water in the pipeline and is calculated by multiplying the inertance per foot times the total length of the pipe. The first shunt capacitance element has a value 0.122 times the total shunt admittance $Y_t$ of the line, which consists mainly of the elastance of the water and metal in the pipeline. This total elastance is calculated by multiplying the elastance of the water and metal in the pipe per foot by the total length of the pipe.

Similarly, the other values of the circuit 56 are determined by using the $n=5$ column in Table I and $Z_t$ or $Y_t$.

The input-output behavior of the pipeline 20 over this range of frequencies can be measured under different assumed service conditions by varying the voltage $E_s$, which is analogous to changes in pressure due to changes in turbine loading and then by observing the behavior of the flow of current through the instrument 72, analogous to flow of water from the reservoir into the pipeline.

If it is desired to represent the behavior of the line 20 over a range including its first six or seven resonant frequencies, etc., then the values of $n=6$ or $n=7$, etc., are used.

Assuming for purposes of illustration that the pipeline 20 be closed at the reservoir end and it is to be represented by a circuit network, then a network configuration corresponding to the generalized network shown in FIGURE 5A is used, with the output terminals in such a representation being open-circuited to represent a velocity node (i.e., a closed end) in the pipe 20.

Similarly, a network such as the network 56 may be used to represent the input and output characteristics of the transmission line 28 up to and including its first five resonances. The voltage $E_s$ applied to the terminals 57 and 58 corresponds to the conditions at the substation 30. The short-circuit across the output terminals 59 and 60 indicates that the generators at the power plant 29 are represented as of low internal impedance, delivering constant voltage regardless of load. In this latter representation, the first series inductance element 61 has a value of .061 times the total series impedance $Z_t$ of the prototype line 28, and so forth for the other elements. The flow of current through the instrument 72 is analogous to the flow of current from the power station 29 to the line 28.

Assuming that the transmission line 28 is 93 miles long, then its first five resonances are 1,000, 2,000, 3,000, 4,000, and 5,000 cycles per second. The network 56 will closely represent the input and output characteristics of the transmission line 28 over a range from zero to 5,000 cycles. And this representation will exactly match the characteristics of the line 28 at these resonant frequencies.

Likewise, the network 56 may be used to represent the input-output characteristics of the propeller shaft 32, wherein the first five torsional resonances of the shaft 32 will be exactly represented and frequencies therebetween will be closely represented. The short-circuit across the terminals 59 and 60 represents the constant velocity of the engine 34. Variations in the voltage $E_s$ correspond to variations in the load imposed on the screw 36, and the variations in the flow of current through the meter 72 correspond to the variations in torsional stress on the shaft 32 near the engine 34.

In FIGURE 8B is shown a "lumped" mechanical system *56a* corresponding to the network 56 and which similarly may be used to represent the input-output characteristics of the systems shown in FIGURES 1, 2, and 3. In the system *56a*, a block or mass *66a* is arranged to have a constant friction force, for example, by being in engagement with a fixed surface, thus corresponding to the fixed head in the reservoir 22, the fixed voltage at the power station 29 or the constant velocity of the engine 34, as the case may be. The small mass *61a* at the other end of the system is moved to correspond to changes in turbine speed, changes in electrical voltage, or changes in propeller load, as the case may be. The coil springs *67a*, *68a*, *69a*, *70a*, *71a*, along mechanical system *56a* represent the elastance or capacity, respectively, of the prototype and are arranged to have relative values as shown; that is, each successive spring has more elastance than the preceding one, i.e. it is less stiff than the preceding one. The blocks *61a*, *62a*, *63a*, *64a*, *65a*, *66a*, of the mechanical system have masses to provide inertance or inductance, respectively, corresponding to the prototype and of relative values as shown, from Table I; that is, each successive block has a greater mass than the preceding one. By varying the motion of the first mass *61a* motions of the last block *66a* are produced which are analogous to the flow of a water from the reservoir 22, or to the flow in current from the power station 28, or to the torsional stress on the shaft 32 near the engine 34, as the case may be.

My invention provides a systematic method for obtaining a desired representation, and the behavior of the representation is entirely predictable, also being considerably better than that obtainable by an equal number of identical elementary components.

*Properties of the Distribution Coefficients of Table I*

It will be noted from FIGURES 6 and 8A and 8B that the successive values of the distribution coefficients are graduated. That is, a "lumped" constant representation embodying my invention is a structure in which the values taper from one end to the other, i.e., it is a non-uniform "lumped" structure even though its purpose is to give a good approximation of the input-output characteristics of a uniform continuous system.

If a "uniform" system were to be represented by a $(2n+1)$ element nominal distribution of impedance and admittance, the nominal coefficients $\phi_k$ and $\psi_k$ would have the values:

$$(13)\quad \begin{cases} \phi_0=\phi_n=\dfrac{1}{2n} \\ \phi_k=\dfrac{1}{n}(k=1, 2, 3, \ldots, n-1) \\ \psi_k=\dfrac{1}{n}(k=1, 2, 3, \ldots, n) \\ \sum_k^n \phi_k \equiv \sum_k^n \psi_k \equiv 1.0 \end{cases}$$

An examination of Table I and its trends shows that for no finite value of $n$ are these nominal uniformity relations ever approximated in a structure embodying my invention. Thus, it is clearly seen that a "lumped" constant structure embodying my invention is inherently non-uniform. Moreover, the way in which these values taper depends upon the order or approximation (i.e. whether $n=5$ or 6, etc.). The extreme coefficients (i.e. $\phi_0$ and $\phi_n$) depend upon the order of approximation. These extreme coefficients can be caluclated from formulae given hereinafter which can be used by anyone desiring to go up to values of "n" above those given in Table I.

$$(14)\quad \phi_0(n)=\frac{0.3183}{n}\left[1-\frac{0.2146}{n}\right]$$

$$(15)\quad \phi_n(n)=\frac{0.7979}{\sqrt{n}}\left[1-\frac{0.0603}{n}\right]$$

where $\phi_0(n)$ is the first coefficient in the column of the table for whatever value of $n$ has been chosen, and $\phi_n(n)$ is the last coefficient in this column.

In order to fill in the values between these extreme coefficients a smoothing formula is given below, where $\theta_k n$ represents all of the values in the column regardless of whether they are $\phi$ or $\psi$ coefficients, that is, $k$ goes from 1 to $2n+1$.

$$(16) \quad \theta_k{}^n=\left[1+\alpha_n\left(\frac{2n+1-k}{2n+1}\right)^2\right]\lambda_{(2n+1-k)}\cdot\phi_n(n)$$

The factor $\lambda_{(2n+1)-k}$ represents the sequence of products obtained by multiplying together the first $[(2n+1)-k]$ roots of the numeric $2/\pi$. That is, for the last coefficient in the column (i.e., for $k=2n+1$) then this factor is unity and the Formula 16 becomes Formula 15. For the next-to-last coefficient, this factor is $2/\pi$; for the second-from-last, it is $$\left(\frac{2}{\pi}\right)\sqrt[2]{\frac{2}{\pi}}$$

and for the third-from-last it is $$\left(\frac{2}{\pi}\right)^2\sqrt{\frac{2}{\pi}}\cdot\sqrt[3]{\frac{2}{\pi}}$$

and so forth. And $$\alpha_n=\frac{1}{\lambda_{2n+1}}\left(\frac{\phi_0(n)}{\phi_n(n)}\right)-1$$

In order more graphically to illustrate the way in which the distribution coefficients in Table I taper, FIGURE 7 shows a plot of these values. Along the horizontal axis are plotted the various distribution coefficients and along the vertical axis are plotted their relative values.

It should be noted that the successive values of the distribution coefficients are graduated and follow smooth curves, discussed more hereinafter, but $\phi_0$ deviates therefrom. This is accounted for by the fact that in the open-circuit case $n$ equals the number of $\pi$-sections (in electrical representations) or analogous structures in mechanical and other systematic representations, whatever is used. And in the short-circuit case, $n$ equals the number of T-sections (in electrical representations or analogous structures in other representations). All but the first elements of the "lumped" structure are in effect combinations of successive input and output elements of the $\pi$ or T-sections involved. By using $2\phi_0$ rather than $\phi_0$ all of the curves do plot smoothly.

It is seen from this graph that in particular for larger values of $n$ the values of the coefficients commence with a very gradual taper which becomes more steep toward the short-circuited (or open-circuited) end of the "lumped" constant structure. In fact, for very large values of $n$, a large portion of the curve is almost uniform, having a rapid increase in values toward one end. Moreover, when looking into the more gradually tapering end of a "lumped" constant structure embodying my invention one sees the same characteristic impedance as one would see looking into the prototype uniform "continuous medium," over the frequency range for which it is a representation of the uniform medium.

*Impedance Characteristics and Time-Delay Characteristics of "Lumped Structures" Embodying the Present Invention*

This characteristic impedance is purely resistive for certain values of $Z_{(p)}$ and $Y_{(p)}$; so that in these cases a "lumped" constant structure embodying my invention can be provided with a matched termination which is purely resistive. This is an advantage of certain "lumped" structures or systems embodying my invention.

Also, a "lumped" constant structure embodying my invention can be used as a matched termination for the end of its prototype "uniform" continuous medium, as discussed in connection with FIGURE 9.

FIGURE 9 shows a "lumped" constant mechanical impedance termination 79 embodying my invention, used as a matched termination for a uniform continuous fluid medium 80 in a pipe 81. The mechanical impedance 79 includes a number of "lumped" mechanical elements 82, 83, 84, 85, and 86 interconnected by springs 87, 88, 89, and 90. In order to present a characteristic impedance $Z_0$ to the fluid 80, the end of the structure 79 having the more gradually tapering values is faced toward the pipe 81. The inertance values of i.e. the masses of the mechanical elements are made equal to $\phi_k Z_t$ (where $\phi_k$ equals the successive values $\phi_0, \phi_1 \ldots \phi_n$ and $Z_t$ is the total impedance of the liquid 80, which usually is merely its total mass $M_t$) and the values of the elastance of the springs are made equal to the $\psi_k Y_t$ (where $\psi_k$ equals the successive values $\psi_1, \psi_2 \ldots \psi_{n-1}, \psi_n$ and $Y_t$ is the total admittance of the liquid, which depends jointly upon the compressibility of the liquid and the total elastance of the pipe $E_t$) all in accordance with the coefficients of Table I. The final element 86 is clamped, for example, by resting in a recess, so as to reflect back to the element 82 such motion as to present the impedance $Z_0$ of the front surface 91 of the first element 82.

The advantage of such a termination 79 is that any vibrational disturbances traveling through the fluid in the pipe 81 are absorbed into the mechanical termination without being reflected back into the fluid medium. That is, pressure variations at the front surface 91 of the first element 82 are converted into corresponding motion of the first element of the mechanical structure without any different action than would be obtained if the fluid actually continued on to the right beyond that plane 91. A measuring instrument 92 may be connected to this first element to record its motion, and hence to record the characteristics of the disturbances present in the fluid 80 without the measurements themselves creating any spurious disturbances in the fluid. The characteristic impedanve $Z_0$ of the fluid 80 can be determined from the expression $\sqrt{Z_t/\gamma_t}$. (See Equation 5 et seq.)

In view of the broad scope of my invention it will be understood by those skilled in the art that the reasoning applied to secure this mechanical termination for a fluid medium system may be used to provide the correct terminating impedance for any type of system. Thus, an acoustical tube may be terminated by a "lumped" constant acoustical structure embodying my invention or by a "lumped" constant mechanical structure, and the like.

In view of the initial gradual taper of a "lumped" constant structure embodying my invention and having large values of $n$, it is possible to economize in the number of elements used and yet to secure a surprisingly good match to a "uniform" medium over a wide range of frequencies. For example, in the mechanical termination shown in FIGURE 9 a value of $n=4$ was used to secure the desired termination impedance. From the foregoing discussion it is seen that by using a value of $n=10$ a better impedance match may be obtained, i.e. a match over a wider range of frequencies.

Substantially the same wider frequency range of matching may be obtained by using only the last nine elements of the $n=10$ lumped constant structure. Thus, with the same number of elements as when $n=4$ one can obtain a fairly good match over a wider frequency range.

The foregoing description more or less has emphasized the value of my invention for the representation of "uniform" continuous media and for the securing of impedance values with "lumped" structures for matching "uniform" continuous media. Another advantage of "lumped" structures or systems embodying my invention is that when looking into the more rapidly tapering end one sees a delay characteristic. This may be shown by considering certain transposition relationships.

*Time-Delay and Filter Characteristics of "Lumped" Structures Embodying the Present Invention*

For purposes of explanation, consider the electrical configuration shown in FIGURE 4B, if the network is transposed, it is only necessary to interchange the operators A and D:

(17)

$$\text{Original Network}\begin{pmatrix} D=A_t \\ B=B_t \\ C=C_t \\ A=D_t \end{pmatrix}\text{Transposed Network}$$

A four terminal network terminating at the receiving end in an impedance $$Z_r=\frac{1}{Y_r}$$

will have transfer characteristics as follows:

(18)
$$E_r/E_s=F_E=1/A+BY_r$$
$$I_r/I_s=F_I=1/D+CZ_r$$

If the network [ABCD] is transposed and so terminated, the transposed transfer characteristics become:

(19)
$$F_E{}^t=1/A^t+B^tY_r=1/D+BY_r$$

(20)
$$F_I{}^t=1/D^t+C^tZ_r=1/A+CZ_r$$

For the *n*th order networks:

(21)

$$Z_{nz}=\text{Original Network}\begin{pmatrix} B_{nz}=Z_t;\,N_n=B^t_{nz} \\ D_{nz}=D_n=A^t_{nz} \end{pmatrix}\text{Transposed Network}$$

(22)

$$Y_{nz}=\text{Original Network}\begin{pmatrix} A_{ny}=D_n=D^t_{ny} \\ C_{ny}=Y_t;\,N_n=C^t_{ny} \end{pmatrix}\text{Transposed Network}$$

If these *n*th order networks are transposed and terminated in $$Z=\frac{1}{Y_0}$$

then, respectively:

(23)
$$F^t_{nE}=\frac{1}{A^t_{nz}+Y_0B^t_{nz}}=\frac{1}{D_n+\gamma N_n}$$
$$\|$$
$$F^t_{nI}=\frac{1}{D_{ny}+Z_0C^t_{ny}}=\frac{1}{D_n+\gamma N_n}$$

As the number *n* becomes large, these expressions become:

(24)
$$F=\lim_{n\to\infty}F_n{}^t=\frac{1}{\cosh\gamma+\sinh\gamma}=e^{-\gamma}$$

In the special case where:

$$Z=L_{(p)}$$
$$Y=C_{(p)}$$

Then:

$$Z_0=\frac{1}{Y_0}=\sqrt{L_{(p)}/C_{(p)}}$$
$$\alpha=\sqrt{L_{(p)}C_{(p)}}$$
$$\gamma=l\alpha=T_d$$

Where *l* is the length of the line.

Whence: $F=e^{-\gamma}=e^{-T_d}$, which represents a time-delay line with a time-delay of $T_d$ seconds. In view of this, it is seen that $F_{ne}{}^t$ and $F_{nI}{}^t$ approximately represent time delays, with the approximation improving as *n* increases.

Thus, in summary of the above, by looking into the more gradually tapering end of certain "lumped" structures or systems embodying my invention one sees a purely resistive characteristic impedance, and by looking into the other end (when the gradual end is terminated in a pure resistance equal to this characteristic impedance) one sees a time-delay.

In order further to explain this time-delay action of certain "lumped" constant structures embodying my invention, consideration is first given to a prototype "uniform" delay line, which for instance might be a pair of parallel wires in which the important factors are the inductance and capacitance. In this line the total series inductance is:

(25)
$$L_t=l.L_{(p)}$$

and the total shunt capacitance:

(26)
$$C_t=l.C_{(p)}$$

where $L_{(p)}$ and $C_{(p)}$ are the values per unit length, and *l* is the length.

In this prototype the time delay is:

(27)
$$T_d=\sqrt{L_tC_t}\text{ seconds}$$

providing that the uniform line is terminated at the receiving end in a pure resistance $R_0$ equal to the characteristic impedance, which is:

(28)
$$Z_0=\sqrt{L_t/C_t}\text{ ohms}$$

In a "lumped" constant electrical network having the same characteristic impedance and delay time as the prototype, the various series inductance and shunt capacitance elements are obtained from Table I, as follows:

(29)
$$L_k=\phi_kL_t$$
$$C_k=\psi_kC_t$$

where $\phi_k$ represents the successive values $\phi_0, \phi_1, \phi_2 \ldots \phi_{n-1}, \phi_n$; and $\psi_k$ represents the values $\psi_1, \psi_2, \ldots \psi_{n-1}, \psi_n$ from one of the columns of Table I.

For example, shown in FIGURE 10 is a "lumped" delay network 100 having a pair of input terminals 102 and 103 and a pair of output terminals 105 and 106. The design value for this line, which has been built and tested, was chosen as *n* equal 9, giving a total number of elements $2n+1$ or 19. As can be seen by comparing FIGURE 10 with FIGURE 5B, the network 100 is essentially an effort driven (voltage driven) structure. From the above discussion, it will be seen that its corresponding dual, a current driven (motion driven) structure, can be built, being generally like FIGURE 5A.

The nominal cut-off frequency for such a time delay network, which also acts like a filter, as explained hereinafter, is determined as follows:

(30)
$$f_o=\frac{n}{4\sqrt{L_tC_t}}=\frac{n}{4T_d}\text{ cycles per second}$$

The nominal rise time for such a network is determined, as follows:

(31)
$$T_r=\frac{1}{2f_c}=\frac{2Td}{n}\text{ seconds}$$

Because of the practical limitations in the size of electrical components, the following relationships between values are given as convenient guides:

(32)
(*a*) $L_t=T_dR_0$
(*b*) $C_t=T_d/R_0=T_d{}^2/L_t$
(*c*) $R_0=L_t/T_d$

The nominal time delay $T_d$ of the delay line 100 was chosen as 1 millisecond and $L_t$ was 10 henries. From Equation 32*c*:

(33)
$$R_0=10/10^{-3}=10{,}000\text{ ohms}$$

And from Equation 32*b*:

(34)
$$C_t=10^{-3}/10^4=10^{-7}=0.1\text{ microfarad}$$

The nominal cut-off frequency from Equation 30 is:

$$f_c=\frac{n}{4T_d}=\frac{9}{4\times10^{-3}}=2{,}250 \text{ c.p.s.} \quad (35)$$

The values $L_9, L_8 \ldots L_2, L_1, L_0$ of the ten inductance elements 107, 108, 109, 110, 111, 112, 113, 114, 115, and 116 which are connected in series between the input and output terminals 102 and 105, respectively, and the values $C_9, C_8 \ldots C_2, C_1$ of the nine capacitance elements 121, 122, 123, 124, 125, 126, 127, 128, 129 which are connected in shunt across the network 100, are all determined from Table I using Equations 29. In the line 100 which I built, these inductors had the successive values of 2.58, 1.42, 1.12, 0.96, 0.86, 0.80, 0.76, 0.72, 0.68, and 0.32 (henries), which follow closely the relative values listed in Table I. The deviations from the values in the table are due to the difficulties of experimentally constructing inductors having precisely predetermined values. The capacitors 121, 122, 123, 124, 125, 126, 127, 128, and 129, were respectively. 0.0172, 0.0122, 0.0102, 0.0090, 0.0083, 0.0078, 0.0075, 0.0070, and 0.0067 (microfarads), following closely the values in Table I.

The response of this delay line to a 30 volt applied step signal is shown in FIGURE 11. It is seen that the time delay network does produce a delay time of one millisecond and that the output voltage rises to its full value shortly after one millisecond.

It should be noted that this delay line structure constitutes quite a good approximation to a "unform" continuous delay line, as measured by the criteria of maximum possible rise time with no overshoot or oscillation and with linear phase characteristics. That is, the rise occurring after 1 millisecond in the region 132 of the curve is steep and in the region 134 following soon after region 132 the curve levels out at 30 volts with no oscillation or overshoot.

In FIGURE 12 is shown the amplitude curve 136 and phase characteristic curve of this delay network 100 both plotted against frequency. It is seen that the amplitude of response 136 is substantially uniform up to the actual cut-off point of 1,400 cycles per second and then attenuates rapidly to zero for higher frequency. The phase response of this time delay network is plotted by the measured points 138 and is seen by reference to the straight line 139 to be very nearly linear throughout the pass band out to the cut-off frequency. This phase response would be even more nearly linear if the experimental setup had included components precisely equal to the ideal values as determined from Table I.

As seen in FIGURE 12 the delay line 100 has a cut-off frequency which is relatively higher than the cut-off frequency from an iterative L-C filter having the same time delay and the same number of circuit elements. Moreover, from the foregoing description it is seen that to a considerable degree the delay time and cut-off frequency may be independently chosen. Among the many advantages of the present invention as applied to time-delay structures and filters are those provided by the fact that the length of the time-delay and the cut-off frequency may be independently and arbitrarily chosen. Thus, in order to have the same time-delay and a lower cut-off frequency a "lumped" line is built with $n$ equal to a smaller value, and in order to increase the cut-off frequency, yet with the same time delay, the "lumped" line is built with $n$ equal to a larger number. That is, by increasing the order of the line, the cut-off frequency (for any given time-delay) is extended. In this way it is possible to build a low pass filter with any arbitrary reasonable time-delay and cut-off frequency, as explained in detail hereinafter.

The above discussion assumed that the inductors 107, 108, 109, 110, 111, 112, 113, 114, 115, and 116 were essentially non-resistive, which assumption may be satisfactory for many applications. In fact, all inductors possess some internal effective resistance, and the following discussion provides a method for compensating a "lumped" network for such resistance. In practice, all of the inductors of such a structure would be wound with approximately the same diameter for reasons of convenience, and hence the parasitic resistance of each inductor is proportional to the length of wire used and hence approximately proportional to the inductance of the coil itself. Thus the coil impedance $Z_k$ may be expressed as follows, where $$p=\frac{d}{dt}:$$

$$Z_k=L_kp+R_k=L_k\left(p+\frac{R_k}{L_k}\right) \quad (36)$$

The small distortion effect due to $R_k/L_k$ may be very nearly offset by deliberately introducing leakage conductance G in parallel with each condenser such that the shunt admittance can be written.

$$Y_k=C_kp+G_k=C_k\left(p+\frac{G_k}{C_k}\right) \quad (37)$$

By making $R_k/L_k$ equal to $G_k/C_k$ the compensated "lumped" line will behave comparably to the distortionless "uniform" continuous line. The attenuation due to the presence of the resistance and leakage conductance is overcome by adding amplification at the output of the line if desired.

As indicated above, when used to provide a time-delay, a structure embodying my invention is connected in the reverse of the same structure when it is used to provide an impedance.

It should be emphasized that one of the advantages of my invention is that a "lumped" constant time-delay structure embodying the invention presents a characteristic impedance at one of its terminals which is purely resistive. Therefore, any such time-delay structure can be terminated in a resistive element (i.e., in electrical structures with a resistor), in acoustical structures with sound absorbent material such as felt or glass filter blankets, and in mechanical structures with a dash pot, such as the brake and drum shown in FIGURE 13 used with the torsional delay line.

This delay-line of FIGURE 13 is also shown with $n$ equal 9, so as to bring out the broad scope of the invention by comparison with FIGURE 10. With this torsional delay line any angular disturbances introduced at the input by moving the tip of the arrow 152 are reproduced at a later period of time by the output arrow 154. Thus, the arrow 154 follows all of the motions of the arrow 152, but at a later period of time, and without any spurious oscillations (i.e. "ring") or over-shoot. This torsional delay line 150 may comprise a thin flat ribbon of spring steel 156 hung from a freely rotatable bearing 158 with inertance elements, i.e., dumbbell-type of weights 160 hung therefrom at intervals. The upper or output end is damped by a friction brake 162 bearing against a brake drum 164 and adjusted by a hand wheel 166 to give a frictional torsional impedance to match the torsional impedance seen from this end of the line 150. The lower, input end, of the line may have a bearing, as shown, or it may hang freely. It is seen that this delay structure 150 is a motion-driven one and so follows the general relationships of FIGURE 5A. Each of the weights 160 is arranged to have a relative value of angular moment of inertia $I_9, I_8, I_7, I_6, I_5, I_4, I_3, I_2, I_1$, corresponding to the value of the coefficients $\psi_k$ in column 9 of Table I (i.e. $I_k=\psi_k \cdot I_t$, where $I_t$ is the total moment of inertia of the prototype "uniform" medium). The spacing between each of these weights is such that the lengths of the strips of steel tape 156 therebetween provide relative torsional elastance values $E_9, E_8, E_7 \ldots E_2, E_1, E_0$, corresponding to the relative values of $\phi_k$ from column 9 (i.e. $E_k=\phi_kE_t$, where $E_t$ is the total torsional elastance of the prototype, which is the reciprocal of its total torsional stiffness, i.e. $1/K_t$).

In this torsional delay structure 150, the delay time $T_d$ is calculated as follows (compare with Equation 27):

$$(36) \qquad T_d=\sqrt{I_t E_t} \text{ seconds}$$

The characteristic impedance is determined as follows (compare with Equation 28):

$$(37) \qquad Z_o=\sqrt{I_t/E_t}=\sqrt{I_t K_t} \text{ lb.-ft.-seconds}$$

and the nominal cut-off frequency $f_c$ and rise time $T_r$ are determined from Equations 30 and 31 given above.

Torsional springs and inertia discs or other mechanical structures may be used in lieu of the arrangement shown, for some purposes, but dumbbell type of weights provided with thumb screws to allow adjustment of their individual length and spacing along the tape 156 may be useful, particularly as an instructional tool to show in a graphic manner the advantage of a "lumped" structure embodying my invention, compared with an iterative time delay line, i.e. one with the dumbbells all of the same size and evenly spaced along the strip 156. Since the rates of motion in this mechanical model are relatively slow and easy to observe it provides a striking demonstration. Any slow deflection of the input pointer 152 causes a corresponding and later signal of the output pointer 154, and the output is a faithful reproduction of the input signal up to certain frequencies. The output pointer does not vibrate spuriously, it does not overshoot, i.e. travel beyond the correct value, neither of which is true of the iterative type of structure. Compare FIGURE 13 with FIGURES 11 and 12 showing the same good characteristics for the electrical time-delay network 100.

Referring again to FIGURE 9 for purposes of further explanation, the characteristic impedance $Z_0$ of the mechanical structure 79 is determined as follows:

$$(38) \qquad Z_0=\sqrt{M_t E_t} \text{ lb.-seconds per ft.}$$

where $M_t$ is the total mass of the liquid and $E_t$ is the effective elastance, which equals the elastance per unit length of the pipe 81 times its length *l*.

If the lumped structure 79 were to be used as a delay line, the element 86 would be the input element and the element 82 would be the output element, and the structure would be an effort driven structure (see FIGURE 5B). The element 82 would be damped by a dashpot arrangement giving a resistance equal to $Z_0$ (see Equation 38), and the time delay $T_d$ would be:

$$(39) \qquad T_d=\sqrt{M_t E_t} \text{ seconds}$$

Equations 30 and 31 would be used for the cut-off frequency $f_c$ and rise time $T_r$.

As mentioned above, a "lumped" time-delay line having values in accord with Table I or with the smoothing formulae given above also acts as a filter. (See Equation 26 et seq.)

Figure 14B:
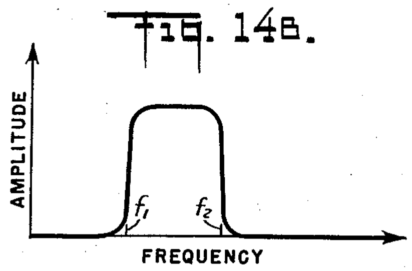

A band pass filter 178 (see FIGURES 14A and 14B) may be made from a lumped structure such as the network 100 by constructing two such "lumped" lines 180 and 182 with the same nominal time-delay $T_d$ but with differing cut-off frequencies, such that the cut-off $f_1$ of the line 180 is lower than $f_2$ of the line 182. A signal to be filtered is fed through the input, indicated at 183, and the output from the filter 180 is subtracted from the output of the filter 182 in the subtractor unit 184. A band pass filter with a pass range from $f_1$ to $f_2$, as shown in FIGURE 14B, results. By using a moderately large value of *n* for the lines 180 and 182, a sharp cut-off at the frequencies $f_1$ and $f_2$ is obtained, and the phase characteristic is very nearly linear.

Figure 15A:
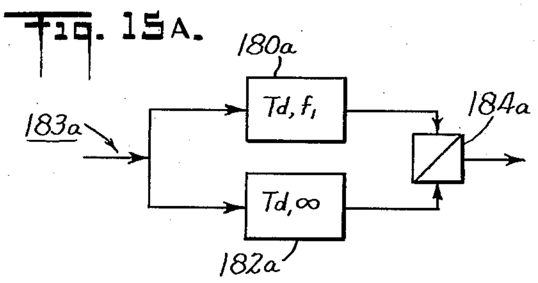
Figure 15B:
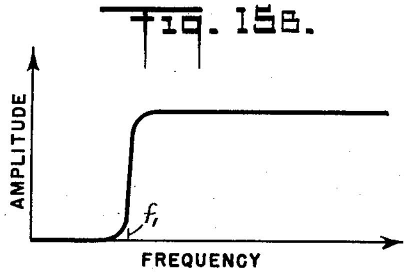

As shown diagrammatically in FIGURES 15A and B, a high-pass filter results when the cut-off frequency of the filter 182*a* is higher than the range including any desired signal frequencies.

Figure 16A:
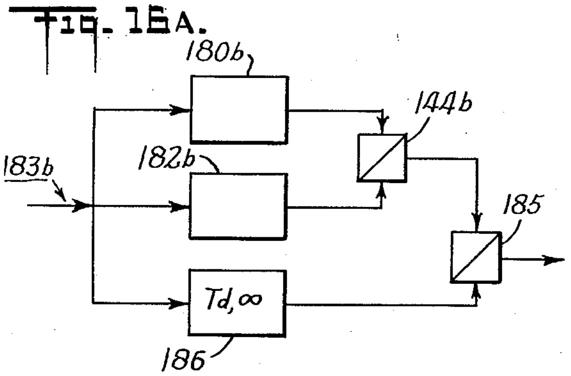
Figure 16B:
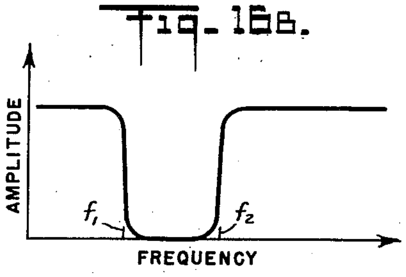

A band stop filter shown in FIGURES 16A and B results when the output from the subtractor unit 144*b* of a band pass filter 178*b*, which includes the "lumped" lines 180*b* and 182*b* is subtracted in a subtractor unit 185 from the output of a filter 186 having a cut-off frequency higher than any desired signal components.

Figure 17B:
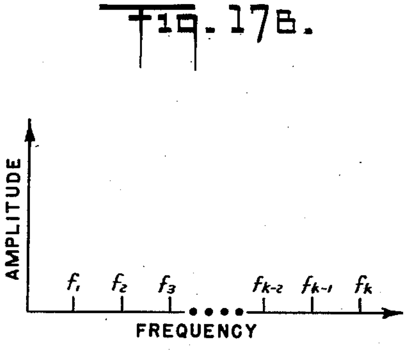

A selective multi-channel filter, shown diagrammatically in FIGURE 17A is built by using *k* different "lumped" filter lines 188, 189, 190, 192, 194, in which the time delays are identical, but with different nominal cut-off frequencies $f_1, f_2, f_3 \ldots f_{k-1}, f_k$. The signal to be filtered is fed through the input, generally indicated at 187, to each of these filter lines. A double throw switch 196, 198, 200, 202, and 204 at the output of each of the lines and connected through a subtractor unit 206 to the output 208 enables the operator to filter any particular desired portion of the frequency spectrum, as shown in FIGURE 17B.

*Further Important Applications and Advantages of the Present Invention*

FIGURE 18A shows a single-stage video filter amplifier, for example for use in a television amplifier, using a "lumped" filter line 220 including a plurality of serially connected inductance elements 222, 223, and 224, and a plurality of shunt-connected capacitance elements 225, 226, 227, 228, and 229, and in which the relative values of these elements are in accord with the coefficients given in Table I. This "lumped" line 220 is used as the plate load for a tube 230, and it has the advantage that its output impedance is resistive so that it can be properly terminated by a matching resistance $R_0$ to eliminate undesired reflections back toward the tube 230. Moreover, its amplitude response and phase characteristics are very nearly ideal for such a filter amplifier, as seen in FIGURE 12, and the cut-off is sharp. Multistage video amplifiers may be built up by using a number of "lumped" lines, with at least one such line used as the plate load of each tube, providing greatly improved amplitude and phase response over that now obtained by iterative structures with the same number of elements, as shown in FIG. 18B.

FIGURE 19 shows the application of the present invention to the problem of vibration filtering and transient pressure control of hydraulic pipelines such as the long oil lines now used to carry petroleum products from refineries to shipping or delivery points. There have been efforts in the past to filter the pressure surges in such lines, because with such long columns of liquid the inertial forces caused by oscillations in velocity are tremendous and may result in pressures which are sufficient to burst the pipeline casing. Nearly all arrangements which have been tried were unstable and led to even further increased oscillations, and so have been abandoned. These lines are now commonly operated as completely closed systems, sometimes with tens of miles of completely closed pipe between each pump, in effect creating a single cylindrical slug of moving liquid, with no provision for accommodating disturbances. The control problems now involved in pumping such pipelines of liquid are very serious ones, which can be readily overcome by the application of aspects of the present invention thereto.

A series of air chambers or surge tanks 260, 262, 264, 266, having horizontal cross sectional areas in accord with the values in Table I, are distributed along the pumping line 268 between the pump 270 and the delivery valve 272 and serve to damp out any oscillations. The spacing of the tanks along the line also is in accord with Table I, thus, for example, providing a line with a cut-off frequency of one cycle per hour, so that no dangerous oscillations can occur therein. One of the advantages of this system over the use of a single surge tank, or a series of identical surge chambers, is that the level total change in the various tanks 260, 262, 264, and 266, following a sudden disturbance at the valve 272, is almost exactly the same, so that the levels in these tanks rise and fall together. Whereas with other arrangements these levels in different tanks would wander wildly up and down causing further disturbances to the flow and possibly sucking air from one or more of the tanks into the line.

Among the many important advantages of the present invention are those resulting from its application to analog computation of all kinds. In analog computers, the operational representation of a four terminal "uniform" continuous medium may be produced by using a feed back amplifier as shown in FIGURE 20, in which a "lumped" line 250 having values in accord with Table I is used in the input path to the amplifier 252, and a second such line 254 is used in the feedback path, generally indicated at 256. This type of circuit renders completely unnecessary the complicated solution by approximate methods of partial differential equations used today in analog computers for this representation of "uniform" media.

It is interesting to note that a voltage driven (effort driven) "lumped" structure corresponding in general behavior to a $Z_{zn}$ line as shown in FIGURE 5B is transformed in effect to a current driven (motion driven) operational structure when it is connected in the feedback loop of a high gain amplifier, and vice versa. That is, at the output terminals 258, the network 254 appears as its own dual. Thus, it is seen that with the use of operational structures embodying my invention a great flexibility and extended range of usefulness is obtained in analog computers. Thus, for example with the circuit arrangement of FIGURE 20, if networks 250 and 254 have impedances $Z_i$ and $Z_t$, respectively, the ratio of the output to input voltages is:

$$-\frac{e_{out}}{e_{in}}=\frac{Z_i}{Z_f}$$

Figure 21:
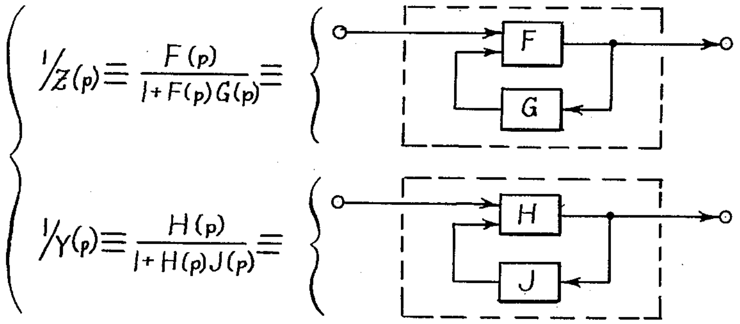

In FIGURE 21 is shown diagrammatically the analog representation of the operational series impedance $Z_{(p)}$ and the operational shunt admittance $Y_{(p)}$ of any "uniform" system of any kind whatsoever. (Note: In Equations 1 and 2 $Z_{(p)}$ and $Y_{(p)}$ were defined more restrictively only because they were then referred to a transmission line, for the transmission line was used as the basis for initiating the development of some of the concepts of the present invention, in order to take advantage of electrical terminology, as explained above. But now $Z_{(p)}$ and $Y_{(p)}$ are being used in their full breath of meaning, as explained in the third sentence following Equations 1 and 2.

Thus, an operational series impedance or shunt admittance may be thought of as an analogous feedback structure involving a forward operation $F_{(p)}$ or $H_{(p)}$, as the case may be, and a feedback operation $G_{(p)}$ or $J_{(p)}$.

According to the present invention the elements within the structures providing the operations within the analog circuits can be distributed in accordance with the values of Table I.

Thus:

$$Z_k=\phi_k Z \qquad Y_k=\psi_k Y \tag{40}$$

Figures 22, 23, 24:
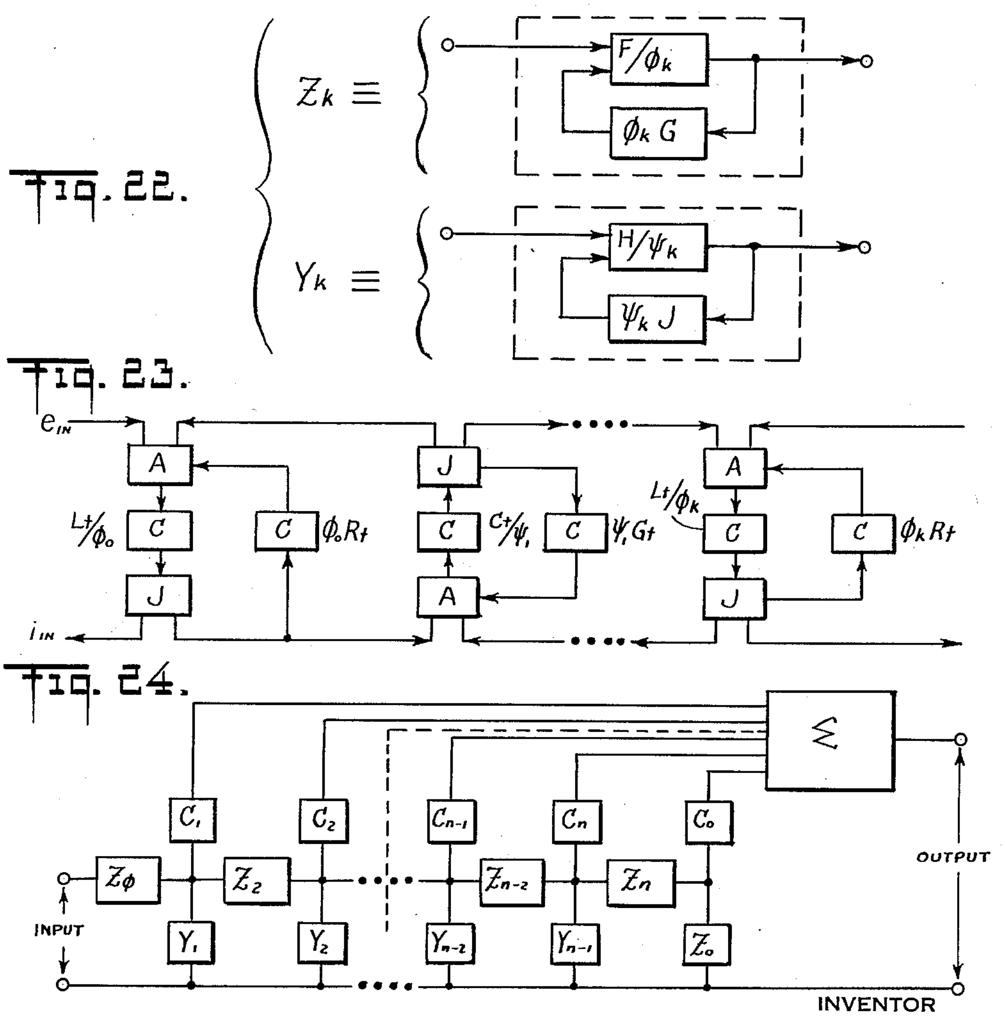

Because the distribution coefficients reach into the feedback loop of the analog structure the result is shown diagrammatically in FIGURE 22.

FIGURE 23 is a diagrammatic illustration showing further the many advantages of the present invention. FIGURE 23 illustrates the analog representation of an RLCG transmission line, where $R_t$, $L_t$, $C_t$, and $G_t$ are the total series resistance, series inductance, shunt capacitance and shunt conductance, respectively. The boxes labelled A represent analog components which perform the function of addition; those labelled J perform the function of integration; and those labelled C perform the function of multiplying by a constant, that is, are amplifiers having a constant gain, the values of these constants being indicated beside the respective boxes.

The RLCG example shown in FIGURE 23 is a special case of more general multiple loop feedback structures, which if they were "continuous" would be governed by the general equations.

$$-\frac{\partial e}{\partial s}=Z_{(p)}\cdot f \qquad -\frac{\partial f}{\partial s}=Y_{(p)}\cdot e \tag{41}$$

where $e$ may be effort and $f$ motion, or $e$ may be voltage and $f$ current, or $e$ may be pressure and $f$ flow, etc., depending upon the kind of system. Thus, the present invention provides a powerful analytical tool, to aid in design, for in many cases the equivalent "continuous" structures are relatively simple to analyze mathematically. Novel systems can actually be discovered by the present invention used in analog analysis. Thus, the analog circuit with its components adjusted in accordance with the values of the distribution coefficients in Table I is used to analyze various "uniform" systems, even including fictitious (i.e. unrealizable) "uniform" systems. When a "uniform" system is discovered having the desired characteristics, the counterpart "lumped" structure is immediately known in terms of the values of the settings of components in the analog circuit, which were set in accordance with the distribution coefficients of Table I.

FIGURE 24 is a diagrammatic representation of a tapped-line or synthesizer network embodying the present invention and useful for the analog representation of complicated operational functions regardless of the nature of Z or Y. In this network the box labelled E is a summing amplifier, the boxes labelled C are amplifiers having a gain as indicated.

As many possible embodiments of the present invention may be made without departing from the scope thereof, it is to be understood that all matter set forth in the description and shown in the drawings is for the purpose of illustrating and teaching the invention and is not intended to be exhaustive of all of its many features which will be seen by those skilled in the art in view of this disclosure. Moreover in the claims, all of the apparatus and methods claimed are intended to cover their "duals" as defined in the specification.

I claim:

1. A "lumped" operational structure having a first end and a second end, a first plurality of impedance elements interconnected in serial relationship between said first end and said second end, and a second plurality of admittance elements, said admittance elements respectively being connected to respective ones of said impedance elements, one of said pluralities including $n$ elements and the other plurality including $n+1$ elements, where $n$ is a whole number, the successive relative values of respective alternate elements of said first and second pluralities being in accordance with the successive values of $\theta_k^n$, where $k$ goes from 1 to $2n+1$, and where $\theta_k^n$ is defined by the following formula:

$$\theta_k^n=\left[1+\alpha_n\left(\frac{2n+1-k}{2n+1}\right)^2\right]\lambda_{(2n+1-k)}\cdot\phi_n(n)$$

where $n$ equals the number of elements of the said one plurality, the factor $\lambda_{(2n+1)-k)}$ is the sequence of products obtained by multiplying together the first $[(2n+1)-k]$ roots of the numeric $2/\pi$, and where $$\alpha_n=\frac{1}{\lambda_{2n+1}}\left(\frac{\phi_0(n)}{\phi_n(n)}\right)-1$$

in which $\phi_0(n)$ is the relative value of the first element of the other plurality and is equal to $$\frac{0.3183}{n}\left[1-\frac{0.2146}{n}\right]$$

and in which $\phi_n(n)$ is the relative value of the last element of the other plurality and is equal to $$\frac{0.7979}{\sqrt{n}}\left[1-\frac{0.0603}{n}\right]$$

2. An operational "lumped" time-delay structure having an input termination and an output termination and having a first plurality of impedance elements connected together in serial relationship between said input termination and said output termination, said impedance elements having successive values in accordance with the relative values of one of the two following sequences of numbers: 51, 104, 108, 116, 131, 168, 322 and 103, 105, 111, 122, 145, 210 and having a second plurality of admittance elements connected respectively to respective ones of said impedance elements, said admittance elements having values in accordance with the relative values of the other of said two sequences of numbers.

3. In an electrical circuit for representing the output response of a "uniform" medium at a predetermined output location to a disturbance introduced at a remote input location; a ladder network for providing "lumped" constant representation of the output response of said medium comprising first and second input terminals, first and second output terminals, said ladder network extending from said first and second input terminals to said first and second output terminals, said ladder network including a first plurality of series circuit components connected together in serial relationship from said first input to said first output terminal and a second plurality of shunt circuit components each connected to one of said series circuit components and being shunted across said network to the second input and output terminals, the impedance values of said series circuit components progressively increasing in said ladder network in a direction from said input to said output terminals, the admittance values of said shunt circuit components progressively increasing in said ladder network in a direction from said input to said output terminals, the relative values of the impedances of said series circuit components being proportional to the relative values of successive alternate numbers in a sequence of numbers, said sequence of numbers being selected from a group of sequences consisting of the following: 250, 541, 750; 142, 289, 311, 367, 547; 99, 199, 205, 218, 244, 295, 452; 75, 152, 154, 159, 168, 182, 209, 257, 394; 61, 122, 124, 127, 131, 137, 146, 160, 185, 229, 353; 51, 103, 104, 105, 108, 111, 116, 122, 131, 145, 168, 210, 322; 44, 88, 89, 90, 92, 94, 96 100, 105, 111, 120, 133, 155, 193, 299; 39, 78, 78, 79, 80, 81, 83; 85, 88, 92, 97, 103, 112, 124, 143, 180, 280; 34, 69, 70, 70, 71, 72, 73, 75, 77, 79, 82, 86, 90, 97, 105, 117, 134, 168, 264; 31, 62, 63, 63, 64, 64, 65, 66, 68, 70, 72, 74, 77, 81, 85, 91, 99, 111, 126, 160, 250; and the relative values of the admittances of said shunt circuit components being proportional to the relative values of the successive intermediate numbers in said sequence.

4. In an electrical circuit for representing the input-output characteristics of a "uniform" medium, a four-terminal chained network electrical representation of said medium comprising first and second input terminals, first and second output terminals, and a first plurality of lumped electrical elements having various impedance values and being connected together at a plurality of junctions in series in said network between said first input and first output terminals, a second plurality of lumped electrical elements having various admittance values and being connected to successive ones of said junctions in shunt branches of said network between said first and second input terminals, the successive lumped elements in said series branches having progressively larger impedance values in a direction from said first input to said output terminal, the successive lumped elements in said shunt branches having progressively larger admittance values in a direction from said input to said output terminals, said impedance values being proportional to the relative values of successive alternate coefficients in a sequence of coefficients, said sequence being selected from a group of sequences consisting of the following: 250, 541, 750; 142, 289, 311, 367, 547; 99, 199, 205, 218, 244, 295, 452; 75, 152, 154, 159, 168, 182, 209, 257, 394; 61, 122, 124, 127, 131, 137, 146, 160, 185, 229, 353; 51, 103, 104, 105, 108, 111, 116, 122, 131, 145, 168, 210, 322; 44, 88, 89, 90, 92, 94, 96, 100, 105, 111, 120, 133, 155, 193, 299; 39, 78, 78, 79, 80, 81, 83, 85, 88, 92, 97, 103, 112, 124, 143, 180, 280; 34, 69, 70, 70, 71, 72, 73, 75, 77, 79, 82, 86, 90, 97, 105, 117, 134, 168, 264; 31, 62, 63, 63, 64, 64, 65, 66, 68, 70, 72, 74, 77, 81, 85, 91, 99, 111, 126, 160, 250; and said admittance values being proportional to the relative values of successive intervening coefficients in said sequence.

5. An electrical network comprising first and second input terminals, first and second output terminals for said network, a first plurality of lumped impedance components connected together at a plurality of junctions in a series circuit between said first input and first output terminals, the relative magnitudes of the impedance values of said components between successive pairs of said junctions in a direction from said input to said output terminals being as set forth by alternate values of the following sequence of numbers .075, .152, .154, .159, .168, .182, .209, .257, .394, and a second plurality of lumped admittance components, one of said admittance components being connected to each of said junctions and being in circuits shunted between said first and second terminals, the relative magnitudes of the admittance values of said admittance components connected to successive junctions in a direction from said input toward said output terminals being as set forth by intervening values of said sequence.

6. An analog computer including a first and second input terminal, a first plurality of components "A" providing an addition function, a second plurality of components "C" providing a multiplication function and a third plurality of components "J" providing an integration function connected to form a plurality of groups, in each of said groups an "A," "C" and "J" component being connected in series with the "C" component being intermediate the "A" and "J" components and with another "C" component in said group being connected across said series-connected "A," "C," and "J" components, the first and second input terminals being connected to the "A" and "J" components of the first group, respectively, said groups being connected in a chained network with the "A" and "J" components of each group connected to the "J" and "A" components, respectively, of the next successive group, and wherein relative values of the multiplication functions of the "C" components in successive groups are proportional to the relative values of a sequence of numbers, said sequence being selected from the group of sequences consisting of the following sequences: 250, 541, 750; 142, 289, 311, 367, 547; 99, 199, 205, 218, 244, 295, 452; 75, 152, 154, 159, 168, 182, 209, 257, 394; 61, 122, 124, 127, 131, 137, 146, 160, 185, 229, 353; 51, 103, 104, 105, 108, 111, 116, 122, 131, 145, 168, 210, 322; 44, 88, 89, 90, 92, 94, 96, 100, 105, 111, 120, 133, 155, 193, 299; 39, 78, 78, 79, 80, 81, 83, 85, 88, 92, 97, 103, 112, 124, 143, 180, 280; 34, 69, 70, 70, 71, 72, 73, 75, 77, 79, 82, 86, 90, 97, 105, 117, 134, 168, 264; 31, 62, 63, 63, 64, 64, 65, 66, 68, 70, 72, 74, 77, 81, 85, 91, 99, 111, 126, 160, 250.

7. A structure for selectively propagating along a path through itself a first group of frequencies while impeding the propagation therealong of a second group of frequencies different from the first group, comprising an input end and an output end, said path extending from the input end to the output end, a first plurality of "lumped" elements coupled to successive spaced points along said path and providing an operational impedance to the propagation of any of said frequencies along said path, a second plurality of "lumped" elements successively coupled to said successive spaced points along said path and providing an operational admittance to the propagation of any of said frequencies along said path, the relative impedance values of said impedance elements along said path being in accordance with the relative values of a sequence of numbers as follows: 44, 89, 92, 96, 105, 120, 155, 299, and the relative admittance values of said admittance elements along said path being in accordance with the relative values of a sequence of numbers as follows: 88, 90, 94, 100, 111, 133, 193.

8. An electrical circuit comprising an amplifier having a common circuit, at least an input terminal and an output terminal, an input circuit, connected to said input terminal, a feedback circuit coupled between said output terminal and said input circuit, and a lumped chained network in said feedback circuit, said network including a first network terminal in circuit with said output terminal, a second network terminal in circuit with said input circuit, a first plurality of impedance elements connected in a series circuit between said first and second network terminals and a second plurality of admittance elements, each being in circuit between one of said impedance elements and said common circuit, the relative impedance values of successive ones of said impedance elements between said first network terminal and said second network terminal being proportional to the relative values of successive alternate coefficients in a sequence of coefficients, said sequence of coefficients being selected from a group of sequences consisting of the following sequences: 250, 541, 750; 142, 289, 311, 367, 547; 99, 199, 205, 218, 244, 295, 452; 75, 152, 154, 159, 168, 182, 209, 257, 394; 61, 122, 124, 127, 131, 137, 146, 160, 185, 229, 353; 51, 103, 104, 105, 108, 111, 116, 122, 131, 145, 168, 210, 322; 44, 88, 89, 90, 92, 94, 96, 100, 105, 111, 120, 133, 155, 193, 299; 39, 78, 78, 79, 80, 81, 83, 85, 88, 92, 97, 103, 112, 124, 143, 180, 280; 34, 69, 70, 70, 71, 72, 73, 75, 77, 79, 82, 86, 90, 97, 105, 117, 134, 168, 264; 31, 62, 63, 63, 64, 64, 65, 66, 68, 70, 72, 74, 77, 81, 85, 91, 99, 111, 126, 160, 250, and the relative admittance values of corresponding successive admittance elements in sequence between said first and second network terminals being proportional to the relative values of successive intermediate coefficients in said sequence.

9. An electrical circuit as claimed in claim 8 and wherein said input circuit also includes a chained network having a third network terminal and a fourth network terminal, said fourth network terminal being coupled to said amplifier input terminal, a third plurality of impedance elements connected in series between said third and fourth network terminals and a fourth plurality of admittance elements, each being in circuit between one of the impedance elements of said third plurality and said common circuit, the relative impedance values of successive ones of said impedance elements between said third network terminal and said fourth network terminal being proportional to the relative values of successive alternate coefficients in a sequence of coefficients, said sequence of coefficients being selected from said group, and the relative admittance values of corresponding successive admittance elements in sequence between said third and fourth network terminals being proportional to the relative values of successive intermediate coefficients in said latter sequence.

10. An electrical circuit including a device for controlling the flow of electrical particles and having at least an input terminal and an output terminal, and a load network coupled to the output terminal of said device, said load network including first and second network input terminals and first and second network output terminals, a chained network coupled between said first network input terminal and first network output terminal, said network including a plurality of inductors connected in a series connection between said first network input terminal and first network output terminal and a plurality of capacitors connected in circuit between said first and second network input terminals, one of said capacitors being connected to each of said inductors, and a resistance of value $R_0$ connected to said first and second network output terminals, successive inductors along said series connection having values $$\left[\phi_k L_t\right]_{k=0}^{k=n}$$

and successive corresponding capacitors having values $$\left[\psi_k C_t\right]_{k=1}^{k=n}$$

where $2n+1$ equals the total number of inductors and capacitors in said network, $R_0=\sqrt{L_t C_t}$, $\phi_k$ and $\psi_k$ are proportional to the values of successive alternate coefficients in a sequence of cofficients, said sequence being selected from the group of sequences consisting of: 250, 541, 750; 142, 289, 311, 367, 547; 99, 199, 205, 218, 244, 295, 452; 75, 152, 154, 159, 168, 182, 209, 257, 394; 61, 122, 124, 127, 131, 137, 146, 160, 185, 229, 353; 51, 103, 104, 105, 108, 111, 116, 122, 131, 145, 168, 210, 322; 44, 88, 89, 90, 92, 94, 96, 100, 105, 111, 120, 133, 155, 193, 299; 39, 78, 78, 79, 80, 81, 83, 85, 88, 92, 97, 103, 112, 124, 143, 180, 280; 34, 69, 70, 70, 71, 72, 73, 75, 77, 79, 82, 86, 90, 97, 105, 117, 134, 168, 264; 31, 62, 63, 63, 64, 64, 65, 66, 68, 70, 72, 74, 77, 81, 85, 91, 99, 111, 126, 160, 250.

11. A pipeline structure for conducting a fluid medium and for controlling oscillations in said fluid medium within said pipe including a pipe, and a plurality of tanks connected to said pipe at points spaced therealong, the relative spacing between said points being proportional to the relative values of successive alternate coefficients in a sequence of numbers, said sequence of numbers being selected from a group of sequences consisting of the following sequences:
250, 541, 750; 142, 289, 311, 367, 547; 99, 199, 205, 218, 244, 295, 452; 75, 152, 154, 159, 168, 182, 209, 257, 394; 61, 122, 124, 127, 131, 137, 146, 160, 185, 229, 353; 51, 103, 104, 105, 108, 111, 116, 122, 131, 145, 168, 210, 322; 44, 88, 89, 90, 92, 94, 96, 100, 105, 111, 120, 133, 155, 193, 299; 39, 78, 78, 79, 80, 81, 83, 85, 88, 92, 97, 103, 112, 124, 143, 180, 280; 34, 69, 70, 70, 71, 72, 73, 75, 77, 79, 82, 86, 90, 97, 105, 117, 134, 168, 264; 31, 62, 63, 63, 64, 64, 65, 66, 68, 70, 72, 74, 77, 81, 85, 91, 99, 111, 126, 160, 250, the relative cross sectional areas of said tanks being proportional to the relative values of successive intermediate coefficients in said sequence.

12. A "lumped" constant termination structure for terminating a "uniform" continuous medium and for matching the surge impedance $Z_0$ of said "uniform" continuous medium comprising a first plurality of "lumped" impedance elements arranged in a series array, a second plurality of "lumped" admittance elements each respectively connected to one of the elements of the first plurality, one end of said array being coupled to said medium, the relative values of successive ones of said impedance elements being equal to the successive products $$\left[\phi_k Z_t\right]_{k=0}^{k=n}$$

and the relative values of successive ones of said admittance elements being equal to the successive products $$\left[\psi_k Y_t\right]_{k=1}^{k=n}$$

where $2n+1$ equals the number of elements in said array, $Z_t$ is the total operational series impedance of said medium, $Y_t$ is the total operational shunt admittance of said medium, and $\phi_k$ and $\psi_k$ are proportional to a sequence of numbers, said sequence being selected from the group of sequences consisting of:
250, 541, 750; 142, 289, 311, 367, 547; 99, 199, 205, 218, 244, 295, 452; 75, 152, 154, 159, 168, 182, 209, 257, 394; 61, 122, 124, 127, 131, 137, 146, 160, 185, 229, 353; 51, 103, 104, 105, 108, 111, 116, 122, 131, 145, 168, 210, 322; 44, 88, 89, 90, 92, 94, 96, 100, 105, 111, 120, 133, 155, 193, 299; 39, 78, 78, 79, 80, 81, 83, 85, 88, 92, 97, 103, 112, 124, 143, 180, 280; 34, 69, 70, 70, 71, 72, 73, 75, 77, 79, 82, 86, 90, 97, 105, 117, 134, 168, 264; 31, 62, 63, 63, 64, 64, 65, 66, 68, 70, 72, 74, 77, 81, 85, 91, 99, 111, 126, 160, 250.

13. A pipeline structure for conducting a fluid medium and for controlling oscillations in said fluid medium within said pipe comprising a pipeline and a plurality of tanks connected to said pipe at points spaced therealong, the relative spacing between said points being proportional to the relative values of successive alternate coefficients in one sequence of coefficients, said sequence being selected from the group of sequences consisting of the following:

250, 541, 750; 142, 289, 311, 367, 547; 99, 199, 205, 218, 244, 295, 452; 75, 152, 154, 159, 168, 182, 209, 257, 394; 61, 122, 124, 127, 131, 137, 146, 160, 185, 229, 353; 51, 103, 104, 105, 108, 111, 116, 122, 131, 145, 168, 210, 322; 44, 88, 39, 90, 92, 94, 96; 100, 105, 111, 120, 133, 155, 193, 299; 39, 78, 78, 79, 80, 81, 83, 85, 88, 92, 97, 103, 112, 124, 143, 180, 280; 34, 69, 70, 70, 71, 72, 73, 75, 77, 79, 82, 86, 90, 97, 105, 117, 134, 168, 264; 31, 62, 63, 63, 64, 64, 65, 66, 68, 70, 72, 74, 77, 81, 85, 91, 99, 111, 126, 160, 250, said tanks having a gas therein in their upper portions and having said liquid in their lower portions, the relative volumes of said tanks being proportional to the successive intermediate coefficients in said one sequence.

14. An electrical network comprising a pair of input terminals and a pair of output terminals, three inductance elements connected in series between said input and output terminals and having relative successive inductance values of 142, 311, and 547 and two capacitance elements connected in shunt across said network, each respective capacitance element being connected intermediate successive ones of said inductance elements and having successive capacitance values of 289 and 367.

15. A "lumped" constant electrical network comprising a pair of input terminals and a pair of output terminals, four "lumped" electrical components connected in series between said pairs of terminals, the successive values of said components having the ratios

99:205:244:542 and three electrical components, each connected in shunt intermediate successive ones of said four series components, the successive values of the three shunt components having the ratios 199:218:295.

16. An electrical network comprising a plurality of sections connected in sequence one after another, each section comprising a wave filter having a different cut-off frequency and a different characteristic impedance, the cut-off frequencies of successive sections increasing progressively and the characteristic impedances of successive sections decreasing progressively, and each successive wave filter having a relative impedance value and a relative admittance value, said relative impedance values of successive wave filters being proportional to alternate numbers in one sequence of numbers, said sequence being selected from the group of sequences consisting of the following:

142, 289, 311, 367, 547; 99, 199, 205, 218, 244, 295, 452; 75, 152, 154, 159, 168, 182, 209, 257, 394; 61, 122, 124, 127, 131, 137, 146, 160, 185, 229, 353; 51, 103, 104, 105, 108, 111, 116, 122, 131, 145, 168, 210, 322; 44, 88, 89, 90, 92, 94, 96, 100, 105, 111, 120, 133, 155, 193, 299; 39, 78, 79, 80, 81, 83, 85, 88, 92, 97, 103, 112, 124, 143, 180, 280; 34, 69, 70, 70, 71, 72, 73, 75, 77, 79, 82, 86, 90, 97, 105, 117, 134, 168, 264; 31, 62, 63, 63, 64, 64, 65, 66, 68, 70, 72, 74, 77, 81, 85, 91, 99, 111, 126, 160, 250; and said relative admittance values being proportional to intervening numbers in said sequence.

17. A structure of "lumped" physical components for selectively propagating certain bands of frequencies along a path through the structure while impeding the propagation along said path of frequencies outside of said bands, said bands of frequencies being uniformly spaced in frequency, said structure including first and second ends, with said path extending from said first to said second end, a first plurality of "lumped" components in serial relationship along said path providing operational series impedance, said structure including a second plurality of "lumped" components in sequence along said path alternating in position with the first plurality and providing operational shunt admittance, the successive impedance values progressively increasing along said path, the successive shunt admittance values progressively increasing along said path, the successive products of admittance and impedance values of successive adjacent "lumped" components of the first and second pluralities progressively increasing along said path, and the relative successive impedance values being proportional to the relative values of successive alternate numbers in a sequence of numbers, said sequence of numbers being selected from the following groups of sequences:

142, 289, 311, 367, 547; 99, 199, 205, 218, 244, 295, 452; 75, 152, 154, 159, 168, 182, 209, 257, 394; 61, 122, 124, 217, 131, 137, 146, 160, 185, 229, 353; 51, 103, 104, 105, 108, 111, 116, 122, 131, 145, 168, 210, 322; 44, 88, 89, 90, 92, 94, 96, 100, 105, 111, 120, 133, 155, 193, 299; 39, 78, 78, 79, 80, 81, 83, 85, 88, 92, 97, 103, 112, 124, 143, 180, 280; 34, 69, 70, 70, 71, 72, 73, 75, 77, 79, 82, 86, 90, 97, 105, 117, 134, 168, 264; 31, 62, 63, 63, 64, 64, 65, 66, 68, 70, 72, 74, 77, 81, 85, 91, 99, 111, 126, 160, 250; and the relative successive admittance values being proportional to the relative values of successive intervening numbers in said sequence.

18. An operational structure having first and second ends adapted for energy transfer at said ends, said structure comprising a first plurality of "lumped" physical components all of the same kind each providing operational series impedance, a second plurality of "lumped" physical components all of the same kind and each providing operational shunt admittance, and means interconnecting the components of said first and second pluralities in alternate serial relationship between said first and second ends with the components of the first plurality alternating in position with the components of the second plurality, the relative values of the operational series impedance of the successive components of the first plurality being proportional to alternate numbers in a sequence of numbers selected from the following sequences:

142, 289, 311, 367, 547; 99, 199, 205, 218, 244, 295, 452; 75, 152, 154, 159, 168, 182, 209, 257, 394; 61, 122, 124, 127, 131, 137, 146, 160, 185, 229, 353; 51, 103, 104, 105, 108, 111, 116, 122, 131, 145, 168, 210, 322; 44, 88, 89, 90, 92, 94, 96, 100, 105, 111, 120, 133, 155, 193, 299; 39, 78, 78, 79, 80, 81, 83, 85, 88, 92, 97, 103, 112, 124, 143, 180, 280; 34, 69, 70, 70, 71, 72, 73, 75, 77, 79, 82, 86, 90, 97, 105, 117, 134, 168, 264; 31, 62, 63, 63, 64, 64, 65, 66, 68, 70, 72, 74, 77, 81, 85, 91, 99, 111, 126, 160, 250; and the relative values of the operational shunt admittance of the successive components of the second plurality being proportional to the intervening numbers in said sequence.

19. A network for use in communication circuits comprising a first terminal and a second terminal, a series of sections, means connecting said sections in series between said first terminal and said second terminal, said sections providing a plurality of series impedance elements and a plurality of shunt admittance elements alternating in sequence with said series impedance elements in a direction from said first to said second terminal, one of said pluralities including $n$ elements and the other plurality including $n+1$ elements, where $n$ is a whole number, the successive relative values of said elements from said first to said second terminal being in accordance with the successive values of $\theta_k^n$, where $k$ goes from 1 to $2n+1$, and where $\theta_k^n$ is defined by the following formula:

$$\theta_k^n=\left[1+\alpha_n\left(\frac{2n+1-k}{2n+1}\right)^2\right]\lambda_{(2n+1-k)}\cdot\phi_n(n)$$

where the factor $\lambda_{(2n+1-k)}$ is the sequence of products obtained by multiplying together the first $[(2n+1)-k]$ roots of the numeric $2/\pi$, and where $$\alpha_n=\frac{1}{\lambda_{2n+1}}\left(\frac{\phi_0(n)}{\phi_n(n)}\right)-1$$

in which $\phi_0(n)$ is the relative value of the first element of the other plurality and is equal to $$\frac{0.3183}{n}\left[1-\frac{0.2146}{n}\right]$$

and in which $\phi_n(n)$ is the relative value of the last element of the other plurality and is equal to $$\frac{0.7979}{\sqrt{n}}\left[1-\frac{0.0603}{n}\right]$$

20. An electric network having a pair of input terminals and a pair of output terminals, a plurality of series impedance elements, a plurality of shunt admittance elements, means connecting said series impedance elements and said shunt admittance elements in circuit between said pairs of terminals, said shunt admittance elements and said series impedance elements alternating in sequence from said pair of input terminals to said pair of output terminals, the relative shunt admittance values of successive shunt admittance elements being proportional to alternate numbers in the following sequence of numbers: 61, 122, 124, 127, 131, 137, 146, 160, 185, 229 and 353, and the relative series impedance values of successive series impedance elements being proportional to the intervening numbers in said sequence.

21. A "lumped" constant mechanical system having predetermined input-output characteristics over a range of frequencies, said predetermined input-output characteristics being representative of the input-output response characteristics of a "uniform" continuous medium over an analogous range of frequencies, said mechanical system having a first and second ends and comprising a first plurality of inertance components and a second plurality of elastance components and means connecting said inertance and elastance components in alternate serial relationship between said first and second ends with the inertance and elastance components being in alternate occurrence in said system, said inertance components having relative successive values of inertance proportional to the relative magnitudes of alternate numbers in a sequence of numbers, said sequence being selected from the following sequences of numbers: 142, 289, 311, 367, 547; 99, 199, 205, 218, 244, 295, 452; 75, 152, 154, 159, 168, 182, 209, 257, 394; 61, 122, 124, 127, 131, 137, 146, 160, 185, 229, 353; 51, 103, 104, 105, 108, 111, 116, 122, 131, 145, 168, 210, 322; 44, 88, 89, 90, 92, 94, 96, 100, 105, 111, 120, 133, 155, 193, 299; 39, 78, 78, 79, 80, 81, 83, 85, 88, 92, 97, 103, 112, 124, 143, 180, 280; 34, 69, 70, 70, 71, 72, 73, 75, 77, 79, 82, 86, 90, 97, 105, 117, 134, 168, 264; 31, 62, 63, 63, 64, 64, 65, 66, 68, 70, 72, 74, 77, 81, 85, 91, 99, 111, 126, 160, 250; and said elastance components having relative successive values of elastance proportional to the relative mainitudes of the intervening numbers in said sequence.

22. In an analogue computer an operational circuit arrangement for analogous representation of the input-output response characteristics of a "uniform" continuous medium over a range of frequencies, said operational circuit arrangement including a pair of input terminals and a pair of output terminals, a first plurality of "A" components for providing an addition function, a second plurality of "C" components for providing a multiplication function, and a third plurality of "J" components for providing an integration function connected to form a plurality of groups, each of said groups having an "A," "C," and "J" component connected in serial relationship with the "C" component of the group being intermediate the "A" and "J" components thereof, and circuit means connecting said groups in a ladder network extending from said pair of input terminals to said pair of output terminals with the "A" and "J" components of each group in said ladder network being connected, respectively, to the "J" and "A" components of the next successive group in said ladder network, and wherein the relative adjusted values of the multiplication functions of the "C" components in successive groups along said ladder network are proportional to the relative values of a sequence of numbers, said sequence being selected from the following sequences: 142, 289, 311, 367, 547; 99, 199, 205, 218, 244, 295, 452; 75, 152, 154, 159, 168, 182, 209, 257, 394; 61, 122, 124, 127, 131, 137, 146, 160, 185, 229, 353; 51, 103, 104, 105, 108, 111, 116, 122, 131, 145, 168, 210, 322; 44, 88, 89, 90, 92, 94, 96, 100, 105, 111, 120, 133 155, 193, 299; 39, 78, 78, 79, 80, 81, 83, 85, 88, 92, 97, 103, 112, 124, 143, 180, 280; 34, 69, 70, 70, 71, 72, 73, 75, 77, 79, 82, 86, 90, 97, 105, 117, 134 168, 264; 31, 62, 63, 63, 64, 64, 65, 66, 68, 70, 72, 74, 77, 81, 85, 91, 99, 111, 126, 160, 250.

23. In an analogue computer, an operation circuit arrangement for analogous representation of the input-output response characteristics of a "uniform" continuous medium over a range of frequencies including the first $n$ characteristic frequencies of said "uniform" continuous medium, wherein $n$ is a whole number, said operational circuit arrangement including a pair of input terminals and a pair of output terminals, a first plurality of "A" components for providing an addition function, a second plurality of "C" components for providing a multiplication function, and a third plurality of "J" components for providing an integration function connected to form $2n+1$ groups, each of said groups having an "A," "C," and "J" component connected in serial relationship with the "C" component in the group being intermediate the "A" and "J" components of the group, and circuit means connecting said groups in a ladder network extending from said pair of input terminals to said pair of output terminals with the "A" and "J" components of each group in said ladder network being connected, respectively to the "J" and "A" components of the next successive group in said ladder network, and wherein the relative adjusted values of the multiplication functions of the "C" components in successive groups of said ladder network are proportional to the succesive values of $\theta_k^n$, where $k$ goes from 1 to $2n+1$, and where $\theta_k^n$ is defined by the following formula:

$$\theta_k^n=\left[1+\alpha_n\left(\frac{2n+1-k}{2n+1}\right)^2\right]\lambda_{(2n+1-k)}\cdot\phi_n(n)$$

where the factor $\lambda_{(2n+1-k)}$ is the sequence of products obtained by multiplying together the first $[(2n+1)-k]$ roots of the numeric $2/\pi$, and where $$\alpha_n=\frac{1}{\lambda_{2n+1}}\left(\frac{\phi_0(n)}{\phi_n(n)}\right)-1$$

in which $\phi_0(n)$ is the relative adjusted value of the multiplication function of the said "C" component in the first group and is equal to $$\frac{0.3183}{n}\left[1-\frac{0.2146}{n}\right]$$

and in which $\phi_n(n)$ is the relative adjusted value of the multiplication function of the said "C" component in the last group and is equal to $$\frac{0.7979}{\sqrt{n}}\left[1-\frac{0.0603}{n}\right]$$

24. An electrical circuit including a first pair of terminals, a second pair of terminals, a first plurality of electrical components, a second plurality of electrical components of a different type from the first plurality, and circuit means connecting said components of the first and second pluralities in circuit between said first and second pair of terminals in alternate series and shunt relationship, the relative circuit values of the successive components of the first plurality from said first pair of terminals to said second pair of terminals being proportional to alternate numbers in the following sequence of numbers: 51, 103, 104, 105, 108, 111, 116, 122, 131, 145, 168, 210 and 322, and the relative circuit values of the successive components of the second plurality being proportional to the intervening numbers in said sequence.

References Cited in the file of this patent

UNITED STATES PATENTS

| | | |
|---|---|---|
| 1,849,656 | Bennett | Mar. 15, 1932 |
| 1,869,031 | Turney | July 26, 1932 |
| 2,297,046 | Bourne | Sept. 29, 1942 |
| 2,423,754 | Bruce | July 8, 1947 |
| 2,472,464 | Bruce | June 7, 1949 |
| 2,514,779 | Martin | July 11, 1950 |
| 2,617,882 | Roberts | Nov. 11, 1952 |

OTHER REFERENCES

Saroka: "Analog Methods in Computation and Simulation," McGraw-Hill, 1954, pages 249–255.